United States Patent
Lee et al.

(10) Patent No.: US 11,591,244 B2
(45) Date of Patent: Feb. 28, 2023

(54) HEADER-EQUIPPED AIR DIFFUSION DEVICE, AND MEMBRANE SEPARATION ACTIVATED SLUDGE DEVICE

(71) Applicant: MITSUBISHI CHEMICAL AQUA SOLUTIONS CO., LTD., Tokyo (JP)

(72) Inventors: Yunje Lee, Toyohashi (JP); Makoto Ideguchi, Toyohashi (JP); Shinsuke Furuno, Shinshiro (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 17/031,344

(22) Filed: Sep. 24, 2020

(65) Prior Publication Data
US 2021/0002158 A1 Jan. 7, 2021

Related U.S. Application Data

(63) Continuation of application No. PCT/JP2019/012854, filed on Mar. 26, 2019.

(30) Foreign Application Priority Data

Mar. 27, 2018 (JP) .............................. JP2018-060720
Apr. 13, 2018 (JP) .............................. JP2018-077611

(51) Int. Cl.
*C02F 3/12* (2006.01)
*B01D 65/02* (2006.01)

(52) U.S. Cl.
CPC ............ *C02F 3/1273* (2013.01); *B01D 65/02* (2013.01); *B01D 2321/185* (2013.01)

(58) Field of Classification Search
CPC .............. B01D 65/02; B01D 2201/087; B01D 2321/185; B01D 2313/26; B01D 2315/06;
(Continued)

(56) References Cited

U.S. PATENT DOCUMENTS 6,162,020 A * 12/2000 Kondo .................... C02F 3/223
    417/54
2008/0290032 A1 * 11/2008 Ton That ............... B01D 61/12
    210/651
(Continued)

FOREIGN PATENT DOCUMENTS

CN     101485959 A     7/2009
CN     103153446 A     5/2013
(Continued)

OTHER PUBLICATIONS

International Search Report issued in Application No. PCT/JP2019/012854, dated Jun. 25, 2019.
(Continued)

*Primary Examiner* — Patrick Orme
(74) *Attorney, Agent, or Firm* — Oblon, McClelland, Maier & Neustadt, L.L.P.

(57) ABSTRACT

Header-equipped air diffusion devices includes, in the header, an air storage unit, on its lower end including inlet(s) for water to be treated, and air supply part(s) and air sending part(s) on the air storage unit upper section. The air diffusion device's air sending part and horizontal tube are connected, air sent from the header being diffused by the air diffusion device, and air sending in the air storage unit is above the air supply part's air supply port. The air storage portion's partition portion, with a 50+mm height, partitions the upper portion into an air supply and an air feeding portion side. The partition portion forms a cylindrical portion and an upper plate portion and the air storage portion's trunk portion serves as part of the air supply portion, and an opening end on a lower end side of the partition portion serves as the air supply port.

10 Claims, 20 Drawing Sheets

(58) Field of Classification Search
CPC .............. B01F 3/04113; B01F 3/04248; B01F 3/04439; B01F 13/0233; B01F 13/025; B01F 2003/04106; B01F 2003/04113; C02F 3/1273; C02F 3/208
See application file for complete search history.

(56) References Cited

U.S. PATENT DOCUMENTS

| | | | |
|---|---|---|---|
| 2009/0194477 | A1 | 8/2009 | Hashimoto |
| 2013/0069256 | A1* | 3/2013 | Garrioch ............. B01F 3/04241 261/122.1 |
| 2015/0265980 | A1* | 9/2015 | Furuno ................. B01F 3/0412 210/151 |
| 2016/0030889 | A1 | 2/2016 | Kim et al. |
| 2016/0114292 | A1 | 4/2016 | Colby et al. |
| 2016/0220963 | A1 | 8/2016 | Johnson et al. |

FOREIGN PATENT DOCUMENTS

| | | |
|---|---|---|
| JP | U-A-52-114564 | 8/1977 |
| JP | 2005-111343 A | 4/2005 |
| JP | A-2009-183939 | 8/2009 |
| JP | 2014-188442 A | 10/2014 |
| JP | 6200931 B2 | 9/2017 |
| JP | A-2018-079442 | 5/2018 |
| JP | A-2018-103134 | 7/2018 |
| KR | 20-0250137 Y1 | 11/2001 |
| WO | WO 2013/039626 A2 | 3/2013 |

OTHER PUBLICATIONS

Written Opinion of the International Search Authority issued in Application No. PCT/JP2019/012854, dated Jun. 25, 2019.
Extended European Search Report dated Apr. 23, 2021, in European Patent Application No. 19774507.8.
Indian Office Action dated May 7, 2021, in Indian Patent Application No. 202017042640.
Korean Office Action dated Mar. 2, 2021 in Korean Patent Application No. 10-2020-7027651 (with English translation), 13 pages.
Combined Chinese Office Action and Search Report dated Feb. 16, 2022 in Chinese Patent Application No. 201980021274.X (with unedited computer generated English translation), 13 pages.
European Office Action dated Jan. 26, 2022 in European Patent Application No. 19774507.8, 8 pages.

* cited by examiner

HEADER-EQUIPPED AIR DIFFUSION DEVICE, AND MEMBRANE SEPARATION ACTIVATED SLUDGE DEVICE

TECHNICAL FIELD

The present invention relates to a header-equipped air diffusion device and a membrane bioreactor.

This application is a continuation application of International Application No. PCT/JP2019/012854, filed on Mar. 26, 2019, which claims the benefit of priority of the prior Japanese Patent Application No. 2018-060720 filed on Mar. 27, 2018 and Japanese Patent Application No. 2018-077611 filed on Apr. 13, 2018, the contents of which are incorporated herein.

BACKGROUND ART

Industrial wastewater or domestic wastewater is subjected to a treatment for removing organic matter and the like contained in the wastewater, and then is reused as industrial water or is released to rivers or the like. An activated sludge method can be provided as an example of a method for treating industrial wastewater or the like. The activated sludge method is a method for decomposing organic matter and the like by aerobic microorganisms by performing aeration.

In addition, in recent years, a membrane bioreactor (MBR) method-based treatment which is a combination of an activated sludge method-based treatment and membrane filtration using a separation membrane module has been performed. In the MBR method-based treatment, as the membrane filtration is continued, organic matter and the like accumulates on a separation membrane surface, so that a decrease in filtration flow rate or an increase in transmembrane pressure difference may occur.

With regard to such a problem, in the MBR method-based treatment, the accumulation of organic matter on the membrane surface is prevented by an air diffusion device installed below the membrane module. Specifically, the accumulation of organic matter on the membrane surface is prevented by the impact generated when bubbles generated from an air diffusion pipe come into contact with the membrane surface, or the vibration of a membrane itself caused by a water flow resulting from the generation of bubbles.

In general, the vicinity of a blower which supplies air to the air diffusion device is not airtightly connected. For this reason, when the operation of the air diffusion device is stopped for the purpose of maintenance or the like, air in the air diffusion pipe flows backward to a blower side and target treatment water infiltrates into the air diffusion pipe from an air diffusion hole, and thus when the operation is resumed, sludge may be dried and hardened in the air diffusion pipe. When the operation and the stop of the air diffusion device are repeatedly performed, the amount of dry sludge increases gradually in the air diffusion pipe, so that the air diffusion pipe is clogged, which is a problem.

Therefore, Patent Literature 1 discloses a device in which a chamber (header) of which a lower end is open is provided upstream of an air diffusion pipe in a state where the chamber is immersed in target treatment water, and a pipe connected to a blower and a pipe connected to the air diffusion pipe are inserted and connected to the chamber. In the device, when the operation is stopped, the target treatment water flows into the chamber from a lower end opening portion of the chamber, so that the water level in the chamber rises. Then, in the chamber, an opening portion of each of the pipes connected to the air diffusion pipe and the blower is blocked by the risen water level. Accordingly, in a state where the operation is stopped, air remains in the air diffusion pipe; and thereby, the target treatment water containing sludge is prevented from infiltrating into the air diffusion pipe from an air diffusion hole.

However, also in the device disclosed in Patent Literature 1, it is difficult to sufficiently prevent sludge from infiltrating into the air diffusion pipe, and when the operation and the stop of the device are repeated, the air diffusion pipe may be clogged by the sludge.

CITATION LIST

Patent Literature

Patent Literature 1: WO 2013/039626 A

SUMMARY OF THE INVENTION

Problem to be Solved by the Invention

An object of the invention is to provide a header-equipped air diffusion device and a membrane bioreactor that can sufficiently prevent sludge from infiltrating into an air diffusion device from a header and can be stably operated even when the operation and the stop are repeated.

Means for Solving Problem

One aspect of the invention has the following configuration.

[1] A header-equipped air diffusion device includes an air diffusion device and a header that are immersed in target treatment water. The header includes an air storage portion that stores air, an air supply portion that feeds the air into the air storage portion, and an air feeding portion through which the air in the air storage portion is fed out. The air supply portion and the air feeding portion are provided in an upper portion of the air storage portion. A target treatment water-inlet port is formed in a lower portion of the air storage portion. The air feeding portion and the air diffusion device are connected to each other, and air which is fed from the header is diffused by the air diffusion device. An air feeding port of the air feeding portion, the air feeding port being open in the air storage portion, is positioned higher than an air supply port of the air supply portion, the air supply port being open in the air storage portion.

[2] In the header-equipped air diffusion device described in [1], a partition portion is provided in the air storage portion to partition an upper portion in the air storage portion into an air supply portion side and an air feeding portion side. A cylindrical portion formed by the partition portion and an upper plate portion and a part of a trunk portion of the air storage portion serves as a part of the air supply portion, and an opening end on a lower end side of the partition portion serves as the air supply port.

[3] In the header-equipped air diffusion device described in [2], a height of the partition portion is 50 mm or greater.

[4] In the header-equipped air diffusion device described in [2] or [3], the partition portion has a flat plate shape, and an angle of the partition portion with respect to a vertical direction is from 0° to 30°.

[5] In the header-equipped air diffusion device described in any one of [1] to [4], a difference in height between the air feeding port of the air feeding portion and the air supply port of the air supply portion is 50 mm or greater.

[6] In the header-equipped air diffusion device described in any one of [1] to [5], the air supply port of the air supply portion is open on an opposite side from the air feeding portion.

[7] In the header-equipped air diffusion device described in any one of [1] to [6], a shield plate which shields scattering matter scattered in the air storage portion is provided on an air supply port side of the air feeding port in the air storage portion.

[8] In the header-equipped air diffusion device described in any one of [1] to [7], the air diffusion device includes a horizontal pipe that is connected to the air feeding portion and extends in a horizontal direction, and a plurality of distribution portions that are provided to extend downward with a gap therebetween in a longitudinal direction of the horizontal pipe and to distribute air from the horizontal pipe. An opening portion is formed on an opposite side of the distribution portion from the horizontal pipe. A position of the air supply port of the air supply portion in a height direction is the same as a position of the opening portion of the distribution portion or is higher than the position of the opening portion.

[9] In the header-equipped air diffusion device described in [8], the horizontal pipe and the distribution portion are connected to each other via a connection pipe portion of which a flow passage cross-sectional area is smaller than a flow passage cross-sectional area of the distribution portion. The air supply port of the air supply portion is positioned lower than a lower end of the connection pipe portion. A difference in height between the air supply port of the air supply portion and the lower end of the connection pipe portion is 50 mm or greater.

[10] In the header-equipped air diffusion device described in [9], the flow passage cross-sectional area of the connection pipe portion is from 20 mm$^2$ to 350 mm$^2$.

[11] In the header-equipped air diffusion device described in any one of [8] to [10], the air feeding portion and the horizontal pipe are connected to each other via a connection pipe having flexibility.

[12] In the header-equipped air diffusion device described in any one of [8] to [11], the air diffusion device further includes a plurality of siphon-type air diffusion pipes that are provided below the horizontal pipe. Air is supplied from the opening portion of the distribution portion to the siphon-type air diffusion pipe.

[13] In the header-equipped air diffusion device described in [12], two or more siphon-type air diffusion pipes are disposed around the distribution portion, and air is supplied from the opening portion of the distribution portion to each of the two or more siphon-type air diffusion pipes around the distribution portion.

[14] A membrane bioreactor includes the header-equipped air diffusion device described in any one of [1] to [13]; and a membrane module that performs membrane separation of sludge-containing treatment water containing activated sludge.

Another aspect of the invention has the following configuration.

[A1] A header-equipped air diffusion device includes an air diffusion device and a header that are immersed in target treatment water. The header includes an air storage portion that stores air, an air supply portion that has a cylindrical shape and feeds the air into the air storage portion, and an air feeding portion which has a cylindrical shape and through which the air in the air storage portion is fed out. The air supply portion and the air feeding portion are provided in an upper portion of the air storage portion. A target treatment water-inlet port is fowled in a lower portion of the air storage portion. The air feeding portion and the air diffusion device are connected to each other, and air which is fed from the header is diffused by the air diffusion device. An air feeding port of the air feeding portion, the air feeding port being open in the air storage portion, is positioned higher than an air supply port of the air supply portion, the air supply port being open in the air storage portion.

[A2] In the header-equipped air diffusion device described in [A1], a difference in height between the air feeding port of the air feeding portion and the air supply port of the air supply portion is 50 mm or greater.

[A3] In the header-equipped air diffusion device described in [A1] or [A2], the air diffusion device includes a horizontal pipe that is connected to the air feeding portion and extends in a horizontal direction, and a plurality of distribution portions that are provided to extend downward with a gap therebetween in a longitudinal direction of the horizontal pipe and to distribute air from the horizontal pipe. An opening portion is formed on an opposite side of the distribution portion from the horizontal pipe. A position of the air supply port of the air supply portion in a height direction is the same as a position of the opening portion of the distribution portion or is higher than the position of the opening portion.

[A4] In the header-equipped air diffusion device described in [A3], the horizontal pipe and the distribution portion are connected to each other via a connection pipe portion of which a flow passage cross-sectional area is smaller than a flow passage cross-sectional area of the distribution portion. The air supply port of the air supply portion is positioned lower than a lower end of the connection pipe portion. A difference in height between the air supply port of the air supply portion and the lower end of the connection pipe portion is 50 mm or greater.

[A5] In the header-equipped air diffusion device described in [A3] or [A4], the air feeding portion and the horizontal pipe are connected to each other via a connection pipe having flexibility.

[A6] In the header-equipped air diffusion device described in [A4] or [A5], the flow passage cross-sectional area of the connection pipe portion is from 20 mm$^2$ to 350 mm$^2$.

[A7] In the header-equipped air diffusion device described in any one of [A1] to [A6], the air supply port of the air supply portion is open on an opposite side from the air feeding portion.

[A8] In the header-equipped air diffusion device described in any one of [A3] to [A7], the air diffusion device further includes a plurality of siphon-type air diffusion pipes that are provided below the horizontal pipe. Air is supplied from the opening portion of the distribution portion to the siphon-type air diffusion pipe.

[A9] In the header-equipped air diffusion device described in [A8], two or more siphon-type air diffusion pipes are disposed around the distribution portion, and air is supplied from the opening portion of the distribution portion to each of the two or more siphon-type air diffusion pipes around the distribution portion.

[A10] A membrane bioreactor includes the header-equipped air diffusion device described in any one of [A1] to [A9]; and a membrane module that performs membrane separation of sludge-containing treatment water containing activated sludge.

Another aspect of the invention has the following configuration.

[B1] A header-equipped air diffusion device includes an air diffusion device and a header that are immersed in target treatment water. The header includes an air storage portion that stores air, an air supply portion that feeds the air into the air storage portion, an air feeding portion through which the air in the air storage portion is fed out, and a partition portion that is provided in the air storage portion. The air supply portion and the air feeding portion are provided in an upper portion of the air storage portion. A target treatment water-inlet port is formed in a lower portion of the air storage portion. The air feeding portion and the air diffusion device are connected to each other and are provided such that air which is fed from the header is diffused by the air diffusion device. The partition portion is provided to partition an upper portion in the air storage portion into an air supply portion side and an air feeding, portion side.

[B2] In the header-equipped air diffusion device described in [B1], a height of the partition portion is 50 mm or greater.

[B3] In the header-equipped air diffusion device described in [B1] or [B2], the air diffusion device includes a horizontal pipe that is connected to the air feeding portion and extends in a horizontal direction, and a plurality of distribution portions that are provided to extend downward with a gap therebetween in a longitudinal direction of the horizontal pipe and to distribute air from the horizontal pipe. An opening portion is formed on an opposite side of the distribution portion from the horizontal pipe. A position of a lower end of the partition portion in a height direction is the same as a position of the opening portion of the distribution portion or the lower end is provided higher than the opening portion.

[B4] In the header-equipped air diffusion device described in [B3], the horizontal pipe and the distribution portion are connected to each other via a connection pipe portion of which a flow passage cross-sectional area is smaller than a flow passage cross-sectional area of the distribution portion. The lower end of the partition portion is provided lower than a lower end of the connection pipe portion.

[B5] In the header-equipped air diffusion device described in [B3] or [B4], the air feeding portion and the horizontal pipe are connected to each other via a connection pipe having flexibility.

[B6] In the header-equipped air diffusion device described in [B4] or [B5], the flow passage cross-sectional area of the connection pipe portion is from 20 mm$^2$ to 350 mm$^2$.

[B7] In the header-equipped air diffusion device described in any one of [B1] to [B6], the partition portion has a flat plate shape, and an angle of the partition portion with respect to a vertical direction is from 0° to 30°.

[B8] In the header-equipped air diffusion device described in any one of [B3] to [B7], the air diffusion device further includes a plurality of siphon-type air diffusion pipes that are provided below the horizontal pipe. Air is supplied from the opening portion of the distribution portion to the siphon-type air diffusion pipe.

[B9] In the header-equipped air diffusion device described in [B8], two or more siphon-type air diffusion pipes are disposed around the distribution portion, and air is supplied from the opening portion of the distribution portion to each of the two or more siphon-type air diffusion pipes around the distribution portion.

[B10] A membrane bioreactor includes the header-equipped air diffusion device described in any one of 1B11 to [B9]; and a membrane module that performs membrane separation of sludge-containing treatment water containing activated sludge.

Effect of the Invention

According to the invention, sludge can be sufficiently prevented from infiltrating into the air diffusion device from the header, and an operation can be stably performed even when the operation and the stop are repeated.

MODE(S) FOR CARRYING OUT THE INVENTION

Figure 1:
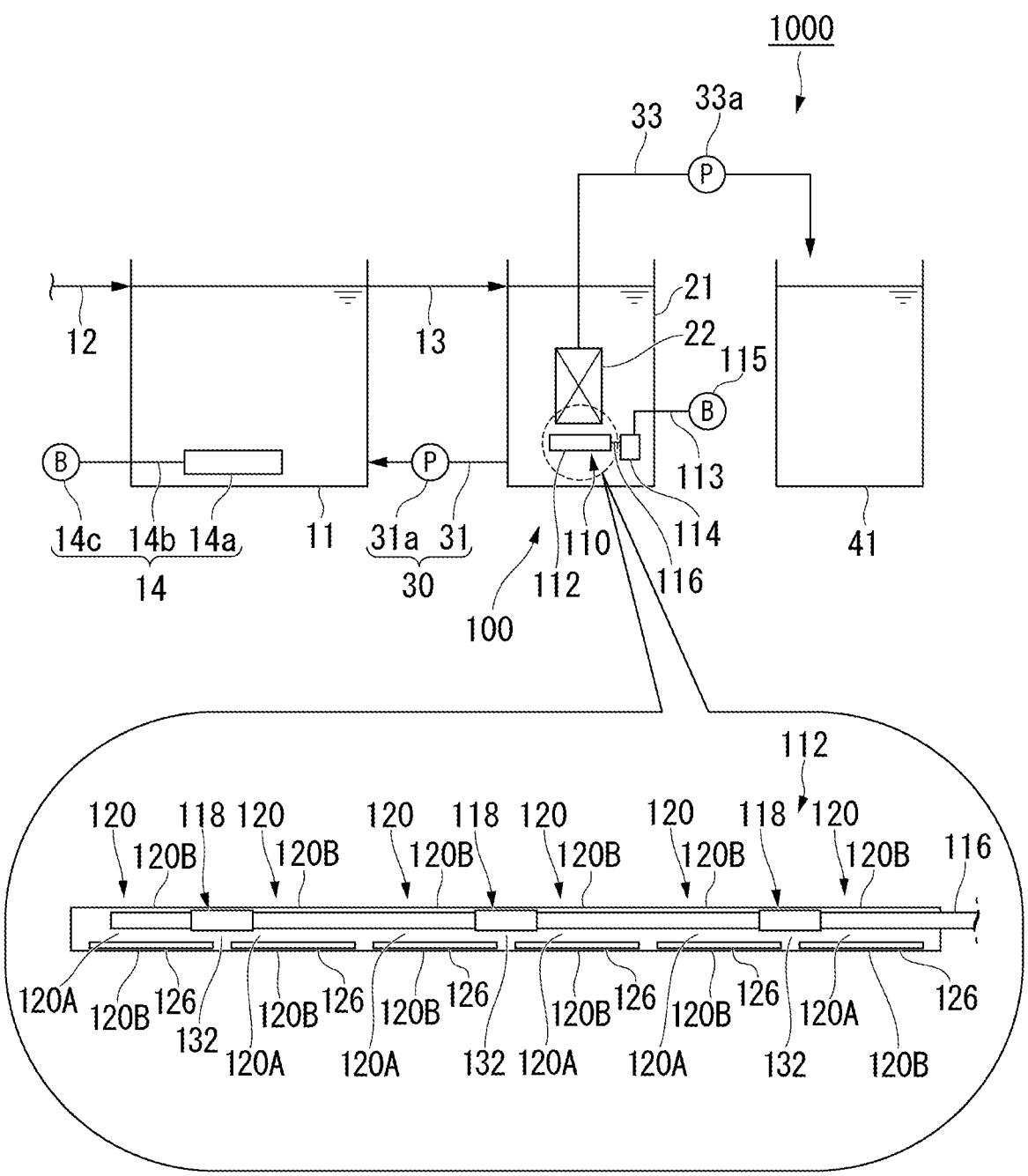
FIG. 1 is a schematic diagram illustrating one example of a water treatment device.

Hereinafter, one example of an embodiment of the invention will be described with reference to the drawings. Incidentally, the drawing dimensions and the like provided as exemplary examples in the following description are merely examples, and the invention is not necessarily limited thereto. Modifications can be appropriately made to the drawing dimensions and the like without departing from the concept thereof.

[Water Treatment Device]

As illustrated in FIG. 1, a water treatment device 1000 includes an activated sludge treatment tank 11, a membrane separation tank 21 which is provided in the subsequent stage of the activated sludge treatment tank 11, and a treatment water tank 41 which is provided in the subsequent stage of the membrane separation tank 21. The water treatment device 1000 further includes a flow rate regulation tank which regulates the flow rate of raw water flowing into the activated sludge treatment tank 11, an extraction pump which extracts excess sludge from the membrane separation tank 21, a liquid feeding unit that feeds a chemical solution or dilution water to the membrane separation tank 21, and a discharging unit that releases treatment water from the treatment water tank 41 to factories, rivers, or the like, but the above-described components are not illustrated.

The activated sludge treatment tank 11 is filled with activated sludge to perform an activated sludge treatment.

A first flow passage 12 and a second flow passage 13 are connected to the activated sludge treatment tank 11. The first flow passage 12 is a flow passage through which raw water discharged from factories, households, or the like flows into the activated sludge treatment tank 11. The second flow passage 13 is a flow passage through which sludge-containing treatment water (target treatment water) discharged from the activated sludge treatment tank 11 flows into the membrane separation tank 21.

An aeration device 14 is installed in the activated sludge treatment tank 11 to maintain aerobic conditions in the tank.

The aeration device 14 includes an aeration pipe 14a which aerates the raw water in the activated sludge treatment tank 11, an introduction pipe 14b which supplies air to the aeration pipe 14a, and a blower 14c which feeds air.

The aeration pipe 14a is not specifically limited as long as the aeration pipe 14a can discharge air upward, which is supplied from the blower 14c, the air being supplied from the blower 14c, and examples of the aeration pipe 14a include a single pipe with a hole and a membrane pipe.

The membrane separation tank 21 stores the sludge-containing treatment water which is fed from the activated sludge treatment tank 11 and contains the activated sludge and biological treatment water.

The membrane separation tank 21 includes a membrane bioreactor 100 (hereinafter, may be referred to as an "MBR device 100") to which one mode of the invention is applied. The MBR device 100 will be described later.

A sludge returning unit 30 is connected to the membrane separation tank 21 and the activated sludge treatment tank 11. The sludge returning unit 30 returns a part of the sludge-containing treatment water from the membrane separation tank 21 to the activated sludge treatment tank 11.

The sludge returning unit 30 includes a fourth flow passage 31. The fourth flow passage 31 is a flow passage through which a part of the sludge-containing treatment water is discharged from the membrane separation tank 21 to flow into the activated sludge treatment tank 11.

A pump 31a is installed in the fourth flow passage 31. Accordingly, a part of the sludge-containing treatment water in the membrane separation tank 21 can be returned from the membrane separation tank 21 to the activated sludge treatment tank 11.

The treatment water tank 41 stores the treatment water resulting from when the sludge-containing treatment water is subjected to membrane separation.

<Membrane Bioreactor>

The MBR device 100 includes a plurality of membrane modules 22 and a header-equipped air diffusion device 110 provided below the membrane modules 22.

The membrane module 22 performs membrane separation of the sludge-containing treatment water containing the activated sludge. The membrane module 22 includes a separation membrane, and the sludge-containing treatment water is separated (membrane separation) into a solid and a liquid, namely, the biological treatment water and the activated sludge by the separation membrane.

The separation membrane is not specifically limited as long as the separation membrane has the separation ability, and examples of the separation membrane include a hollow fiber membrane, a flat membrane, a tubular membrane, a monolithic membrane, and the like. Among these membranes, the hollow fiber membrane is preferable due to having a high volume filling ratio.

When the hollow fiber membrane is used as the separation membrane, examples of the material thereof include cellulose, polyolefin, polysulfone, polyvinylidene fluoride (PVDF), polytetrafluoroethylene (PTFE), and the like. Among these materials PVDF and PTFE are preferable as the material of the hollow fiber membrane from the viewpoint of chemical resistance and resistance to a pH change.

When the monolithic membrane is used as the separation membrane, it is preferable that a ceramic membrane is used.

With regard to the average pore diameter of fine pores formed in the separation membrane, the average pore diameter is generally from approximately 0.001 to 0.1 µm for a membrane called an ultrafiltration membrane, and is generally from approximately 0.1 to 1 µm for a membrane called a precision separation membrane. In the embodiment, it is preferable that a separation membrane having an average pore diameter within the above-described range is used.

A third flow passage 33 is connected to the membrane modules 22. The third flow passage 33 is a flow passage through which the treatment water that has permeated through the separation membranes is discharged from the membrane separation tank 21 to flow into the treatment water tank 41.

A pump 33a is installed in the third flow passage 33. Accordingly, the treatment water which has permeated through the separation membranes of the membrane modules 22 can be discharged from the membrane separation tank 21.

[Header-Equipped Air Diffusion Device]

Figure 2:
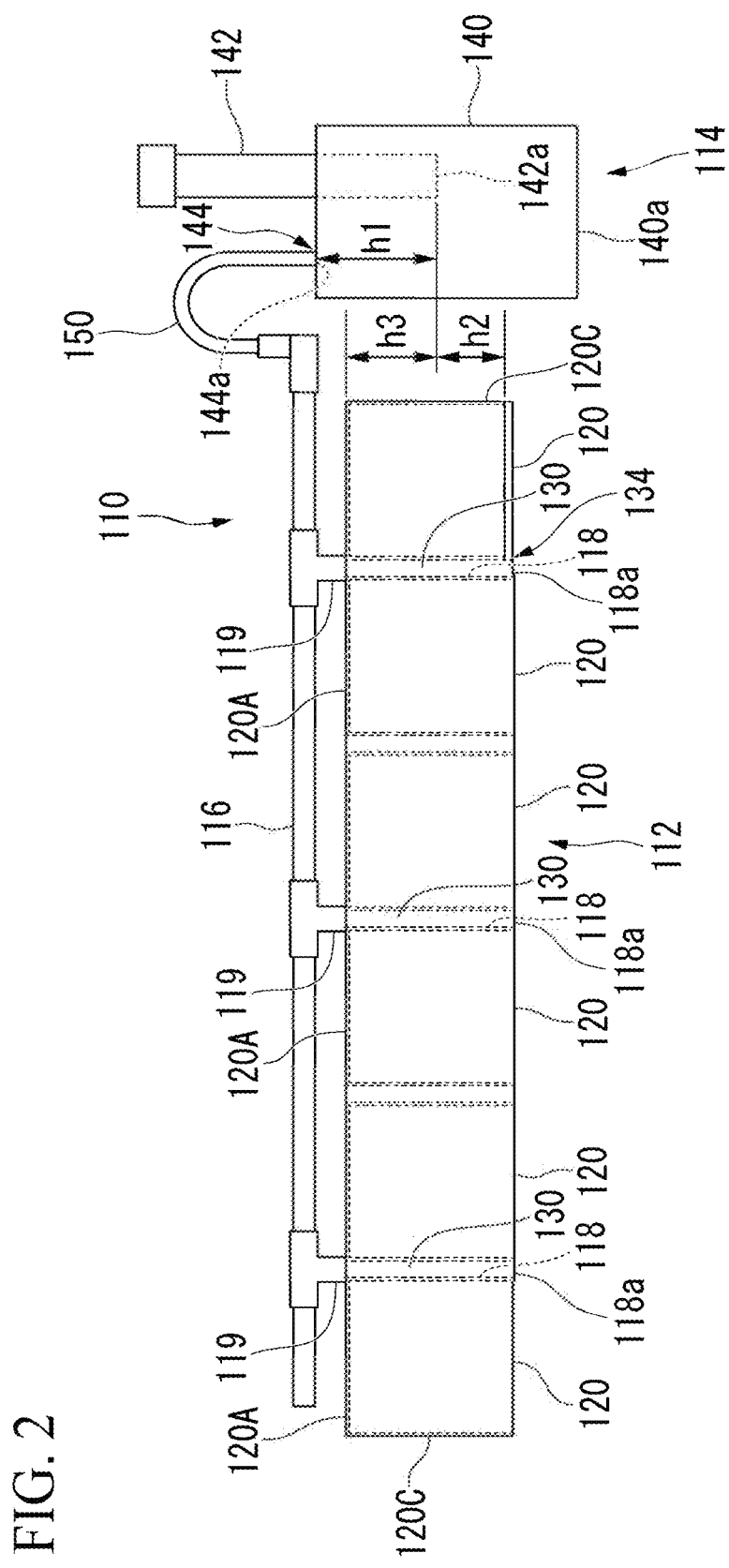
FIG. 2 is a front view illustrating one example of a header-equipped air diffusion device of the invention.

As illustrated in FIGS. 1 and 2, the header-equipped air diffusion device 110 includes an air diffusion device 112 and a header 114 provided upstream of the air diffusion device 112. Both of the air diffusion device 112 and the header 114 are provided in the membrane separation tank 21 in a state where the both are immersed in the sludge-containing treatment water (target treatment water).

(Air Diffusion Device)

The air diffusion device 112 includes a horizontal pipe 116 extending in a horizontal direction, three distribution portions 118 that are provided with a gap therebetween in a longitudinal direction of the horizontal pipe 116 to distribute air from the horizontal pipe 116, and six siphon-type air diffusion pipes 120 that are disposed side by side in a row in the horizontal direction.

Each of the distribution portions 118 is provided to be connected to the horizontal pipe 116 via a connection pipe portion 119 and to extend downward from the horizontal pipe 116. The six siphon-type air diffusion pipes 120 are provided side by side in the longitudinal direction of the horizontal pipe 116 and below the horizontal pipe 116 such that two siphon-type air diffusion pipes 120 are positioned on both sides of each of the distribution portions 118.

The siphon-type air diffusion pipe 120 is a box-shaped casing formed by the combination of a plurality of plate-shaped members. As illustrated in FIGS. 1, 4, 5, 6A, and 6B, the siphon-type air diffusion pipe 120 includes an upper plate portion 120A, two side plate portions 120B, two side plate portions 120C, a bottom plate portion 120D, a first partition wall 122, and a second partition wall 124.

Each of the two side plate portions 120B and the two side plate portions 120C forming each of the siphon-type air diffusion pipes 120 has a rectangular shape, and the width of the side plate portion 120B is wider than that of the side plate portion 120C. The two side plate portions 120B and the two side plate portions 120C forming each of the siphon-type air diffusion pipes 120 are provided to extend downward from a lower surface of the upper plate portion 120A such that surfaces of the side plate portions 120B face each other and surfaces of the side plate portions 120C face each other. A rectangular cylinder having a rectangular cross-section is formed by the two side plate portions 120B and the two side plate portions 120C. In each of the siphon-type air diffusion pipes 120, an in-plane direction of the side plate portion 120B is parallel to the longitudinal direction of the horizontal pipe 116.

In the air diffusion device 112, the upper plate portions 120A of the six siphon-type air diffusion pipes 120 are integrally formed from one flat plate, and the side plate portions 120B on both sides of the six siphon-type air diffusion pipes 120 are integrally formed from one flat plate, respectively. The six siphon-type air diffusion pipes 120 are connected to each other such that the surfaces of the side plate portions 120C of the siphon-type air diffusion pipes 120 adjacent to each other face each other.

An air diffusion hole 126 having a rectangular shape is formed in a portion of the upper plate portion 120A, the portion being close to the side plate portion 120B remote from the horizontal pipe 116 in a plan view, to extend along the side plate portion 120B.

The bottom plate portion 120D is provided to extend inward from a portion on a side of the side plate portion 120B where the air diffusion hole 126 is formed, the portion being close to a lower end of the side plate portion 120B. The length of the bottom plate portion 120D from the side plate portion 120C in the in-plane direction of the bottom plate portion 120D is shorter than that of the upper plate portion 120A. Substantially a half of a lower opening portion of the rectangular cylinder formed by the two side plate portions 120B and the two side plate portions 120C is blocked by the bottom plate portion 120D, and a portion of the opening portion, the portion not being blocked by the bottom plate portion 120D, serves as a treatment water inlet portion 127.

The first partition wall 122 is a rectangular shape in a front view, and is provided to extend downward from the upper plate portion 120A such that a surface of the first partition wall 122 faces the surface of the side plate portion 120B with the air diffusion hole 126 interposed therebetween. A lower end 122a of the first partition wall 122 is separated from the bottom plate portion 120D. The treatment water inlet portion 127 is positioned lower than the lower end 122a of the first partition wall 122.

The second partition wall 124 is provided to extend upward from an end portion of the bottom plate portion 120D, the end portion being positioned on an opposite side of the first partition wall 122 from the air diffusion hole 126. The surfaces of the first partition wall 122 and the second partition wall 124 face each other. An upper end 124a of the second partition wall 124 is separated from the upper plate portion 120A. The upper end 124a of the second partition wall 124 is positioned higher than the lower end 122a of the first partition wall 122.

A siphon chamber 128 is formed inside the siphon-type air diffusion pipe 120. The siphon chamber 128 is a portion that stores air. The siphon chamber 128 represents a space that is positioned closer to a treatment water inlet portion 127 side than the first partition wall 122 in the siphon-type air diffusion pipe 120 and has a height from the upper end 124a of the second partition wall 124 to the lower end 122a of the first partition wall 122. The siphon chamber 128 is divided into a first siphon chamber 128A and a second siphon chamber 128B by the second partition wall 124.

An upper portion of the first siphon chamber 128A and an upper portion of the second siphon chamber 128B communicate with each other via a communication portion 125. A portion from the second siphon chamber 128B to the air diffusion hole 126 in the siphon-type air diffusion pipe 120 serves as a path 123.

In the siphon-type air diffusion pipe 120, when the target treatment water is assumed to flow from the treatment water inlet portion 127 toward the air diffusion hole 126, the treatment water inlet portion 127 side is referred to as an "upstream side" and an air diffusion hole 126 side is referred to as a "downstream side".

The material of the siphon-type air diffusion pipe 120 is not specifically limited, and examples of the material include polyethylene, polypropylene, AS resin, ABS resin, acrylic resin (PMMA), polyvinyl chloride resin (PVC), polyacetal resin (POM), polyamide resin (PA), polyethylene terephthalate resin (PET), polybutylene terephthalate resin (PBT), polycarbonate resin (PC), modified polyphenylene ether resin (PPE), polyphenylene sulfide resin (PPS), polyether ether ketone resin (PEEK), polysulfone resin (PSI), polyether sulfone resin (PES), and the like. The material of the siphon-type air diffusion pipe 120 may be one type or a combination of two or more types. In addition, metals such as stainless steels (SUS304 series and SUS316 series) may be used.

The flow passage cross-sectional area of the horizontal pipe 116 is larger than the flow passage cross-sectional area of the connection pipe portion 119. The shape of the horizontal pipe 116 is not specifically limited, and examples of the shape include a circular cylinder shape, a polygonal cylinder shape, and the like. For example, when the cross-sectional shape of the horizontal pipe 116 is circular, the inner diameter of the horizontal pipe 116 preferably is 10 mm or greater.

The flow passage cross-sectional area of the horizontal pipe 116 is preferably 100 $mm^2$ or greater, and more preferably from 300 $mm^2$ to 2,000 $mm^2$. When the flow passage cross-sectional area of the horizontal pipe 116 is the lower limit value of the above-described range or greater, the inside of the horizontal pipe 116 is less likely to be blocked by sludge. When the flow passage cross-sectional area of the horizontal pipe 116 is the upper limit value of the above-described range or less, the air diffusion device 112 becomes compact.

Incidentally, the flow passage cross-sectional area of the horizontal pipe 116 is the minimum value of the area of a flow passage cross-section obtained when the horizontal pipe 116 is cut in a direction perpendicular to the longitudinal direction of the horizontal pipe 116 (in a vertical direction).

The horizontal pipe 116 is not specifically limited, and examples of the horizontal pipe 116 include pipes and tubes made of fluorine resins such as polyvinyl chloride, polyethylene, polypropylene, PTFE, PVDF, tetrafluoroethylene-perfluoroalkyl vinyl ether copolymer (PFA) and resins such as nylon and polyurethane, and pipes made of metals such as stainless steels (SUS304 series and SUS316 series). The material of the horizontal pipe 116 may be one type or a combination of two or more types.

In this example, the distribution portion 118 is a cylindrical portion that is formed by the two side plate portions 120C which face each other in the siphon-type air diffusion pipes 120 on both adjacent sides, two side plate portions 130 provided to connect end portions of the side plate portions 120C, and a top plate portion 132 provided to block an upper opening end of a rectangular cylinder including the two side plate portions 120C and the two side plate portions 130.

In this example, the distribution portion 118 shares the side plate portions 120C with the siphon-type air diffusion pipes 120 on both adjacent sides. In addition, a pair of the side plate portions 130 and the top plate portion 132 forming the distribution portion 118 are integrated with the siphon-type air diffusion pipes 120 adjacent thereto.

An opening portion 118a is formed on an opposite side of the distribution portion 118 from the horizontal pipe 116. The opening portion 118a includes an opening end at a lower end of the distribution portion 118, and cutout portions 134 that are formed in lower end portions of the side plate portions 120C in the distribution portion 118, the side plate portions 120C being shared with the siphon-type air diffusion pipes 120. The opening portion 118a of the distribution portion 118 serves as an air supply port that supplies air to the siphon-type air diffusion pipe 120.

The material of the distribution portion 118 is not specifically limited, and examples of the material include the same materials provided as examples of that of the siphon-type air diffusion pipe 120. The material of the distribution portion 118 may be one type or a combination of two or more types.

The flow passage cross-sectional area of the distribution portion 118 is preferably 300 $mm^2$ or greater, and more preferably from 500 $mm^2$ to 3,000 $mm^2$. When the flow passage cross-sectional area of the distribution portion 118 is the lower limit value of the above-described range or greater, the inside of the distribution portion 118 is less likely to be blocked by sludge. When the flow passage cross-sectional area of the distribution portion 118 is the upper limit value of the above-described range or less, the air diffusion device 112 becomes compact.

Incidentally, the flow passage cross-sectional area of the distribution portion 118 is the minimum value of the area of a flow passage cross-section obtained when the distribution portion 118 is cut in a direction perpendicular to a longitudinal direction of a flow passage in the distribution portion 118 (in the horizontal direction).

The horizontal pipe 116 and the distribution portion 118 are connected to each other via the connection pipe portion 119, of which the flow passage cross-sectional area is smaller than that of the distribution portion 118, to connect a flow passage in the horizontal pipe 116 and the flow passage in the distribution portion 118.

The shape of the connection pipe portion 119 is not specifically limited, and examples of the shape include a circular cylinder shape, a polygonal cylinder shape, and the like.

The flow passage cross-sectional area of the connection pipe portion 119 is preferably from 20 $mm^2$ to 350 $mm^2$, more preferably from 28 $mm^2$ to 200 $mm^2$, further preferably from 35 $mm^2$ to 100 $mm^2$, and particularly preferably from 40 $mm^2$ to 60 $mm^2$. When the flow passage cross-sectional area of the connection pipe portion 119 is the lower limit value of the above-described range or greater, the inside of the connection pipe portion 119 is less likely to be blocked by sludge. When the flow passage cross-sectional area of the connection pipe portion 119 is the upper limit value of the above-described range or less, it becomes easy to uniformly distribute air to the siphon-type air diffusion pipes 120.

Incidentally, the flow passage cross-sectional area of the connection pipe portion 119 is the minimum value of the area of a flow passage cross-section obtained when the connection pipe portion 19 is cut in a direction perpendicular to a longitudinal direction of a flow passage in the connection pipe portion 119. The flow passage cross-sectional area of at least a part of the connection pipe portion 119 is preferably from 20 $mm^2$ to 350 $mm^2$.

The material of the connection pipe portion 119 is not specifically limited, and examples of the material include the same materials provided as examples of that of the horizontal pipe 116. The material of the connection pipe portion 119 may be one type or a combination of two or more types.

In the air diffusion device 112, the siphon-type air diffusion pipes 120 and the distribution portions 118 which are alternately arranged in this way are integrated. Since the air diffusion device 112 having such a mode does not require aligning the position of the opening portion 118a of the distribution portion 118 in an upward and downward direction, or aligning the position of each of the siphon-type air diffusion pipes 120 in the upward and downward direction, it is easy for the siphon-type air diffusion pipes 120 to uniformly diffuse air. In addition, the operation of assembly of the air diffusion device 112 is easy and the number of components can be reduced, which is advantageous in cost.

In the air diffusion device 112, each of the siphon-type air diffusion pipes 120 is provided below the horizontal pipe 116. Since the horizontal pipe 116 is positioned above each of the siphon-type air diffusion pipes 120, air can be uniformly supplied from the opening portions 118a of the distribution portions 118 to the siphon-type air diffusion pipes 120; and thereby, air can be uniformly diffused from the siphon-type air diffusion pipes 120. In addition, since the height of the MBR device 100 is lower than that of an MBR device using an air diffusion device in which members are present above a horizontal pipe, the MBR device 100 becomes compact.

It is preferable that the air diffusion device 112 is provided at a position where a gap between the adjacent separation membranes in the membrane modules 22 overlaps the air diffusion hole 126 of each of the siphon-type air diffusion pipes 120 when the membrane separation tank 21 is viewed from above. Incidentally, the air diffusion device 112 may be provided such that the air diffusion hole 126 of each of the siphon-type air diffusion pipes 120 intersect the membrane module 22 when the membrane separation tank 21 is viewed from above.

(Header)

Figure 3:
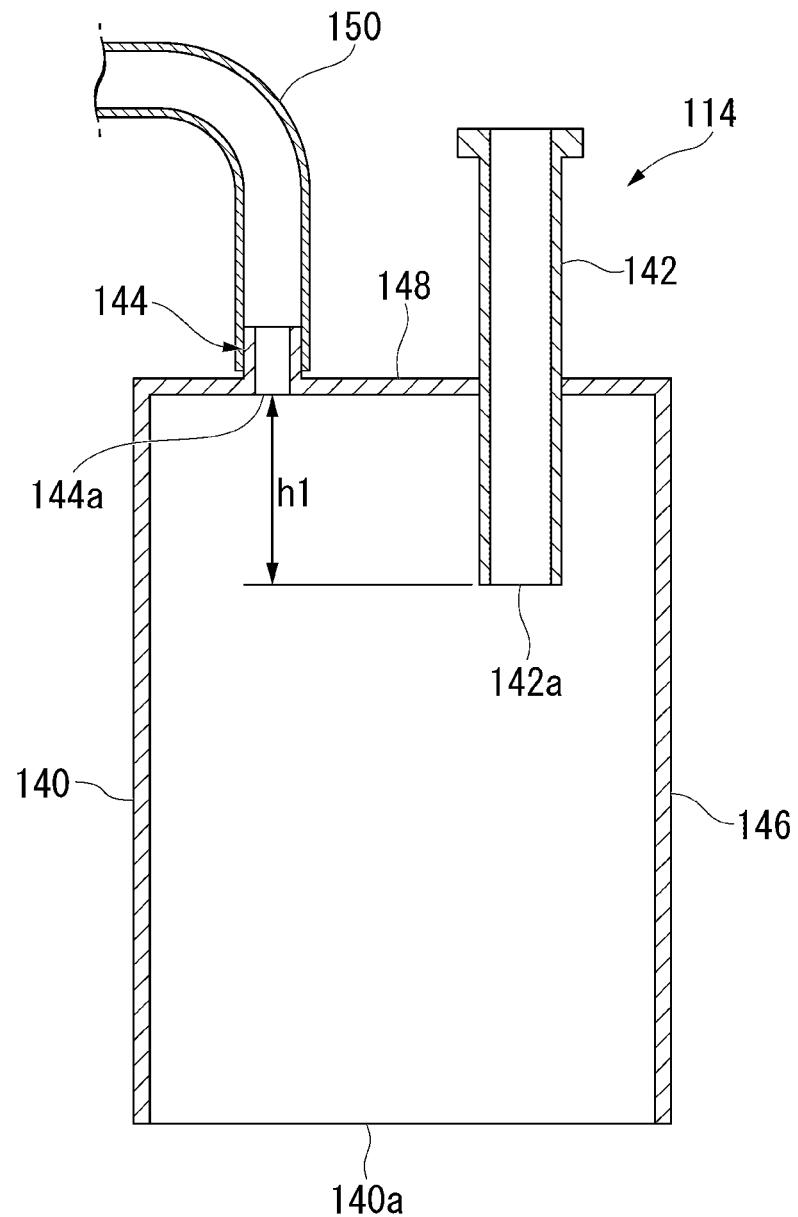
FIG. 3 is a sectional view of a header in the header-equipped air diffusion device of FIG. 2.
Figure 4:
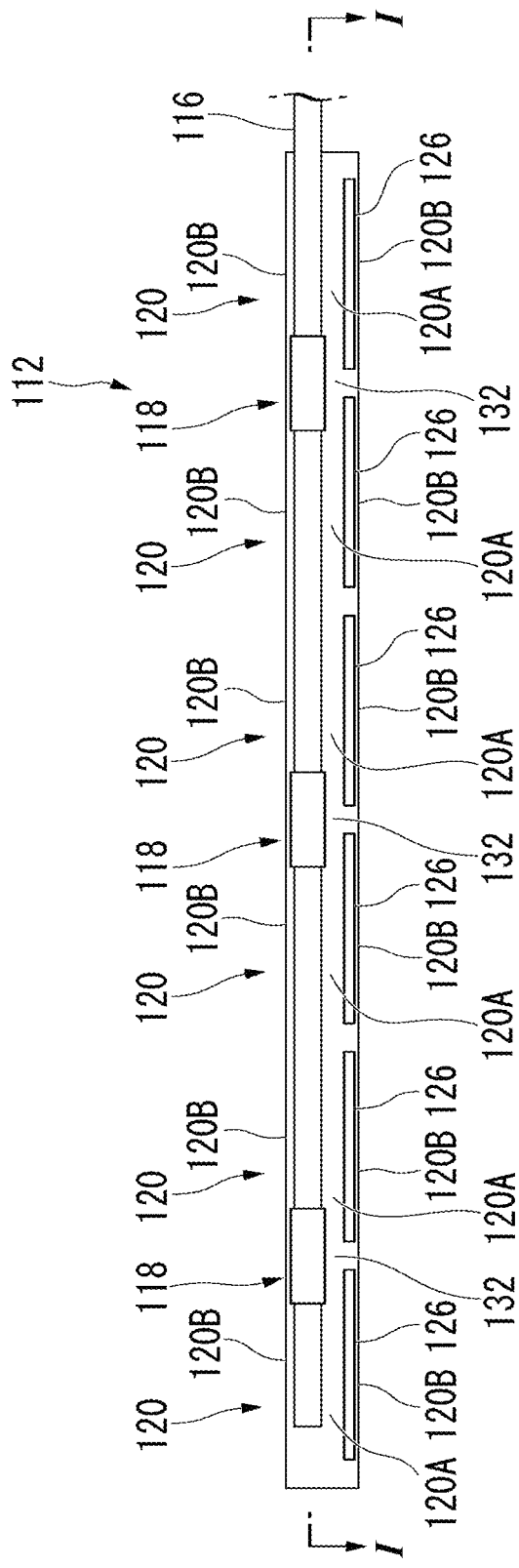
FIG. 4 is a plan view of an air diffusion device in the header-equipped air diffusion device of FIG. 2.
Figure 5:
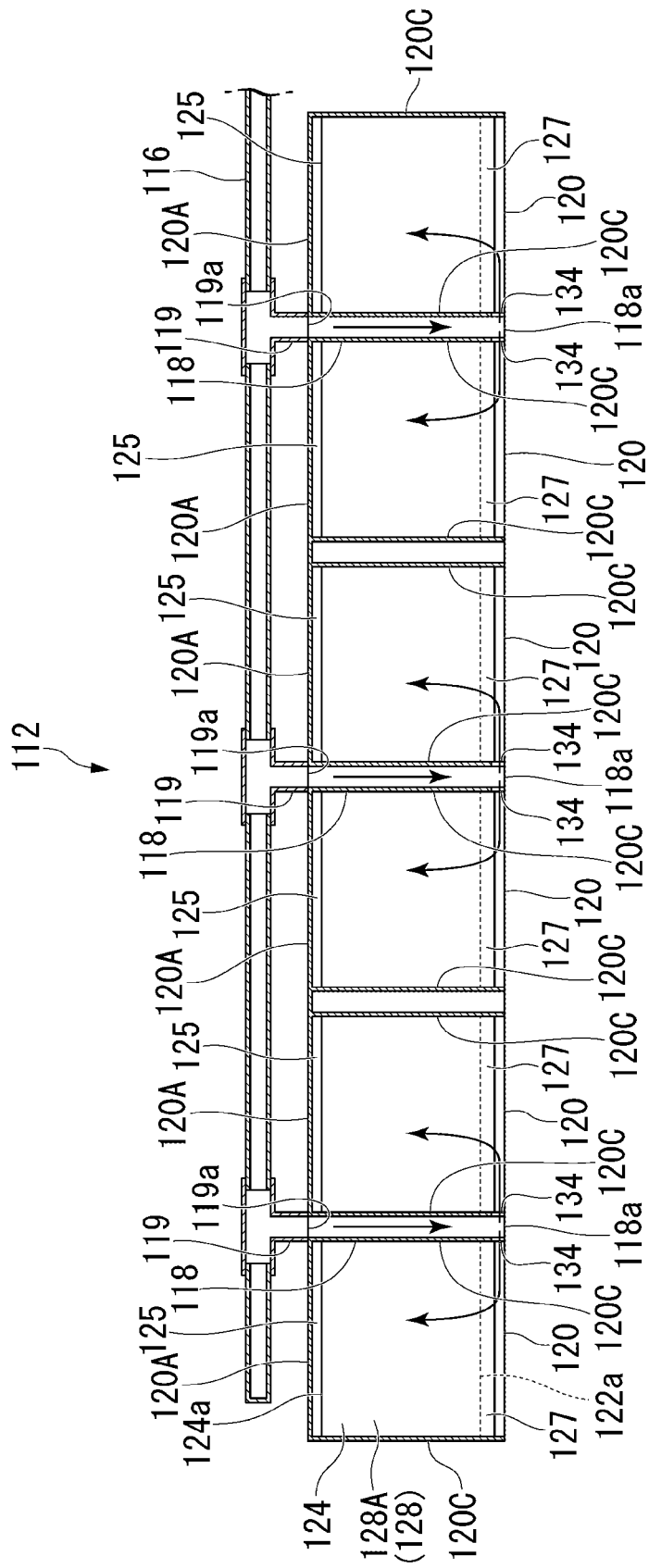
FIG. 5 is a sectional view of the air diffusion device of FIG. 4 taken along line I-I.

As illustrated in FIGS. 2 and 3, the header 114 includes an air storage portion 140, an air supply portion 142, and an air feeding portion 144.

The air storage portion 140 is a portion that stores air, and includes a trunk portion 146 having a cylindrical shape and an upper plate portion 148 provided to close an upper opening end of the trunk portion 146. A lower end side of the trunk portion 146 in the air storage portion 140 is open. Namely, a target treatment water-inlet port 140a is formed in a lower portion of the air storage portion 140.

The shape of the air storage portion 140 is not specifically limited, and examples of the shape include a circular cylinder shape, a polygonal cylinder shape, and the like.

The cross-sectional area of an air storage portion obtained when the air storage portion 140 is cut in the horizontal direction is preferably 10,000 mm$^2$ or greater, and more preferably from 20,0001 mm$^2$ to 1,000,000 mm$^2$. When the above-described cross-sectional area of the air storage portion 140 is the lower limit value of the above-described range or greater, the air storage portion 140 is less likely to be blocked by sludge. When the above-described cross-sectional area of the air storage portion 140 is the upper limit value of the above-described range or less, the air diffusion device 112 becomes compact.

In the header 114, the air supply portion 142 and the air feeding portion 144 are provided in the upper plate portion 148 of the air storage portion 140. As described above, the air supply portion 142 and the air feeding portion 144 are provided in an upper portion of the air storage portion 140.

In the header 114, the air supply portion 142 is provided on a side of the air storage portion 140, which is farther from the air diffusion device 112 than the air feeding portion 144. Accordingly, the layout becomes simpler and the header-equipped air diffusion device 110 becomes more compact.

The air supply portion 142 has a cylindrical shape, and is provided to penetrate through the upper plate portion 148 of the air storage portion 140. The air supply portion 142 is connected to a blower 115 via a pipe 113. Accordingly, air which is fed from the blower 115 through the pipe 113 is fed into the air storage portion 140 from the air supply portion 142.

The shape of the air supply portion 142 is not specifically limited, and examples of the shape include a circular cylinder shape, a polygonal cylinder shape, and the like.

The flow passage cross-sectional area of the air supply portion 142 is preferably 2,000 mm$^2$ or greater, and more preferably from 3,000 mm$^2$ to 8,000 mm$^2$. When the flow passage cross-sectional area of the air supply portion 142 is the lower limit value of the above-described range or greater, the air supply portion 142 is less likely to be blocked by sludge. When the flow passage cross-sectional area of the air supply portion 142 is the upper limit value of the above-described range or less, the air diffusion device 112 becomes compact.

Incidentally, the flow passage cross-sectional area of the air supply portion 142 is the minimum value of the area of a flow passage cross-section obtained when the air supply portion 142 is cut in a direction perpendicular to a longitudinal direction of a flow passage in the air supply portion 142.

The air feeding portion 144 is a portion through which air in the air storage portion 140 is fed out, and is provided in a cylindrical shape to protrude upward from the upper plate portion 148 of the air storage portion 140. The air feeding portion 144 of the header 114 is connected to the horizontal pipe 116 of the air diffusion device 112 via a connection pipe 150. Accordingly, air stored in the air storage portion 140 is fed to the horizontal pipe 116 of the air diffusion device 112 from the air feeding portion 144.

The shape of the air feeding portion 144 is not specifically limited, and examples of the shape include a circular cylinder shape, a polygonal cylinder shape, and the like.

The flow passage cross-sectional area of the air feeding portion 144 is preferably 100 mm$^2$ or greater, and more preferably from 300 mm$^2$ to 2,000 mm$^2$. When the flow passage cross-sectional area of the air feeding portion 144 is the lower limit value of the above-described range or greater, the air feeding portion 144 is less likely to be blocked by sludge. When the flow passage cross-sectional area of the air feeding portion 144 is the upper limit value of the above-described range or less, the air diffusion device 112 becomes compact.

Incidentally, the flow passage cross-sectional area of the air feeding portion 144 is the minimum value of the area of a flow passage cross-section obtained when the air feeding portion 144 is cut in a direction perpendicular to a longitudinal direction of a flow passage in the air feeding portion 144.

In the header 114, an air feeding port 144a of the air feeding portion 144, the air feeding port 144a being open in the air storage portion 140, is positioned higher than an air supply port 142a of the air supply portion 142, the air supply port 142a being open in the air storage portion 140. Incidentally, in the invention, when the air feeding port of the air feeding portion or the air supply port of the air supply portion is not open downward, a positional relationship in a height direction between the air feeding port of the air feeding portion, the air feeding port being open in the air storage portion, and the air supply port of the air supply portion, the air supply port being open in the air storage portion, is based on an upper end of the air supply port or the air feeding port. When a plurality of the air supply ports which are open in the air storage portion are formed in the air supply portion of the air storage portion, the positional relationship is based on an uppermost air supply port.

Since the air feeding port 144a of the air feeding portion 144 is positioned higher than the air supply port 142a of the air supply portion 142, it is prevented that sludge infiltrates into the horizontal pipe 116 of the air diffusion device 112 from the air storage portion 140 and the horizontal pipe 116 or the connection pipe portion 119 is clogged by the sludge.

More specifically, in general, since the vicinity of the blower is not highly airtight, in the above-described device of the related art disclosed in Patent Literature 1, when the operation is stopped, the target treatment water flows into the header from the lower end opening portion of the header, so that the water level rises. In this case, in the device disclosed in Patent Literature 1, when the opening portion of the pipe connected to the blower is blocked by the risen water level of the target treatment water, the opening portion of the pipe connected to the air diffusion pipe is also blocked by the water level at the same time. For this reason, it is considered that when the operation is resumed, the target treatment water containing sludge may easily infiltrate into the air diffusion pipe from the header and the air diffusion pipe may be clogged by dry sludge.

Figure 7A:
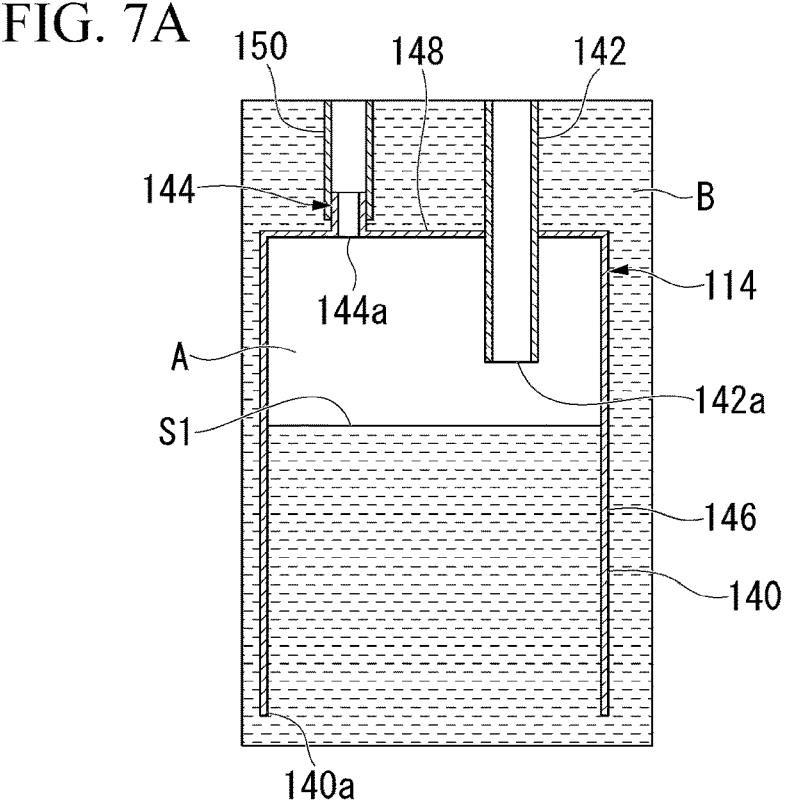
FIG. 7A is a sectional view describing an operation mechanism of the header.
Figure 7B:
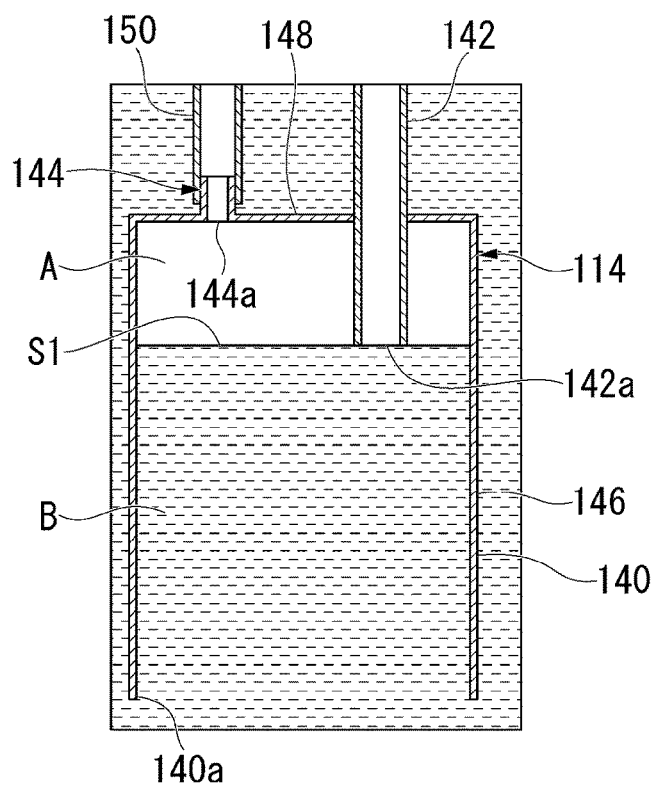
FIG. 7B is a sectional view describing the operation mechanism of the header.

In contrast, in the header-equipped air diffusion device 110 of the embodiment, when the operation is stopped, as illustrated in FIG. 7B, while air A stored in the air storage portion 140 flows backward from the air supply portion 142, sludge-containing treatment water B (target treatment water) flows into the air storage portion 140 from the target treatment water-inlet port 140a at the lower end, so that a water level S1 in the air storage portion 140 rises. Then, when the air supply port 142a of the air supply portion 142 is blocked by the water level S1, the rise of the water level S1 stops, and the air A remains stored in a portion in the air storage portion 140, the portion being positioned higher than the air supply port 142a of the air supply portion 142, and inside the air diffusion device 112.

As described above, in the header-equipped air diffusion device 110, since the air feeding port 144a of the air feeding portion 144 is positioned higher than the air supply port 142a of the air supply portion 142, when the operation is stopped, the air feeding port 144a of the air feeding portion 144 is in the state of being separated from the water level S1. Namely, even in a state where the operation is stopped, the sludge-containing treatment water B does not reach the air feeding portion 144 in the air storage portion 140. For this reason, even when the operation is resumed, sludge is less likely to infiltrate into the air diffusion device 112 from the air feeding portion 144; and thereby, the horizontal pipe 116 or the like is prevented from being clogged by dry sludge.

A difference h1 in height between the air feeding port 144a of the air feeding portion 144 and the air supply port 142a of the air supply portion 142 is preferably from 50 mm to 500 mm, and more preferably from 100 mm to 300 mm. When the difference h1 is the lower limit value of the above-described range or greater, sludge is easily prevented from infiltrating into the air diffusion device 112 from the header 114. When the difference h1 is the upper limit value of the above-described range or less, the air diffusion device 112 becomes compact.

The air supply port 142a of the air supply portion 142 in the header 114 is positioned higher than the opening portion 118a of the distribution portion 118 in the air diffusion device 112. In the invention, when the air diffusion device is provided which has a mode where the distribution portion extending downward from the horizontal pipe is provided, it is preferable that the position of the air supply port of the air supply portion of the header in the height direction is the same as the position of the opening portion of the distribution portion or is higher therethan. Accordingly, when the operation is stopped, the rise of the water level in the air storage portion stops when the water level reaches the air supply port of the air supply portion; and thereby, it is possible to easily obtain a sufficient effect of preventing sludge from infiltrating into the air diffusion device from the header.

Incidentally, in the invention, when the air supply port of the air supply portion or the opening portion of the distribution portion is not open downward, a positional relationship in the height direction between the air supply port of the air supply portion, the air supply port being open in the air storage portion, and the opening portion of the distribution portion is based on an upper end of the air supply port or the opening portion. When a plurality of the air supply ports which are open in the air storage portion are formed in the air supply portion of the air storage portion, the positional relationship is based on the uppermost air supply port.

A difference h2 in height between the air supply port 142a of the air supply portion 142 and the opening portion 118a of the distribution portion 118 is preferably from 5 mm to 200 mm, and more preferably from 10 mm to 180 mm. When the difference h2 is the lower limit value of the above-described range or greater, sludge is easily prevented from infiltrating into the air diffusion device 112 from the header 114. When the difference h2 is the upper limit value of the above-described range or less, the air diffusion device 112 becomes compact.

The air supply port 142a of the air supply portion 142 in the header 114 is positioned lower than a lower end 119a of the connection pipe portion 119 of the air diffusion device 112. As described above, in the invention, when the air diffusion device is provided which has a mode where the horizontal pipe and the distribution portion are connected to each other via the connection pipe portion of which the flow passage cross-sectional area is smaller than that of the distribution portion, it is preferable that the air supply port of the air supply portion of the header is positioned higher than the lower end of the connection pipe portion. Accordingly, sludge is easily prevented from clogging the connection pipe portion.

A difference h3 in height between the air supply port 142a of the air supply portion 142 and the lower end 119a of the connection pipe portion 119 is preferably 50 mm or greater, and more preferably from 100 mm to 180 mm. When the difference h3 is the lower limit value of the above-described range or greater, the connection pipe portion 119 is easily prevented from being clogged by sludge. When the difference h3 is the upper limit value of the above-described range or less, the air diffusion device 112 becomes compact.

It is preferable that the connection pipe 150 connecting the air feeding portion 144 and the horizontal pipe 116 has flexibility. Accordingly, even when the air diffusion device 112 or the header 114 vibrates during operation, the vibration is absorbed and reduced by the connection pipe 150; and thereby, damage is less likely to occur in the air diffusion device 112 or the header 114.

Incidentally, "the connection pipe has flexibility" implies that the minimum radius of curvature is 1,000 mm or less.

As the material of the connection pipe 150 having flexibility, any material may be used as long as the connection pipe 150 made of the material has flexibility, and examples of the connection pipe 150 include a PVC hose, a silicone hose, a fluorine hose, and the like. The material of the connection pipe 150 may be one type or a combination of two or more types.

The flow passage cross-sectional area of the connection pipe 150 is preferably 100 mm$^2$ or greater, and more preferably from 300 mm$^2$ to 2,000 mm$^2$. When the flow passage cross-sectional area of the connection pipe 150 is the lower limit value of the above-described range or greater, the connection pipe 150 is less likely to be blocked by sludge. When the flow passage cross-sectional area of the connection pipe 150 is the upper limit value of the above-described range or less, the air diffusion device 112 becomes compact.

Incidentally, the flow passage cross-sectional area of the connection pipe 150 is the minimum value of the area of a flow passage cross-section obtained when the connection pipe 150 is cut in a direction perpendicular to a longitudinal direction of a flow passage in the connection pipe 150.

Hereinafter, an operation mechanism of the header-equipped air diffusion device 110 will be described.

Figure 6A:
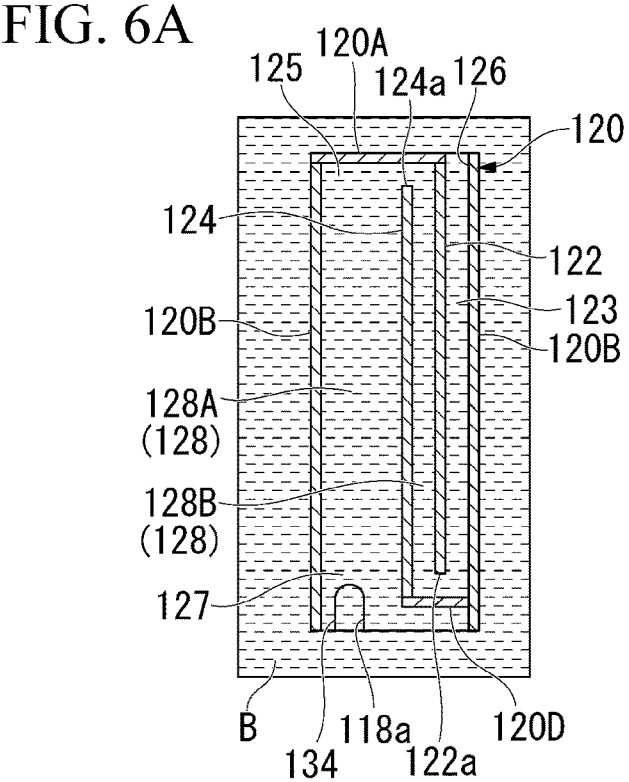
FIG. 6A is a sectional view describing an operation mechanism of the air diffusion device.

Before the operation is started, as illustrated in FIG. 6A, the siphon chamber 128, the communication portion 125, and the path 123 in the siphon-type air diffusion pipe 120 are filled with the sludge-containing treatment water B (target treatment water). Air is fed from the blower 115 through the pipe 113 and, as illustrated in FIG. 7A, the air A is feed into the air storage portion 140 from the air supply portion 142. While the air A is temporarily stored in the air storage portion 140 to push down the water level S1 in the header 114, a part of the air A is fed to the horizontal pipe 116 of the air diffusion device 112 from the air feeding portion 144 through the connection pipe 150.

Figure 6B:
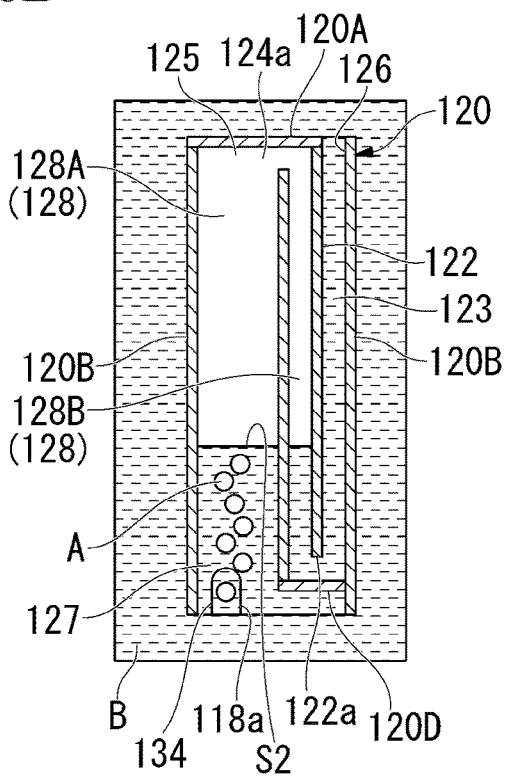
FIG. 6B is a sectional view describing the operation mechanism of the air diffusion device.

The air fed to the horizontal pipe 116 is distributed to each of the distribution portions 118 to be fed to the siphon-type air diffusion pipe 120 from the treatment water inlet portion 127 through the opening portion 118a of the distribution portion 118. As described above, when the air A is continuously supplied to the siphon-type air diffusion pipe 120, as illustrated in FIG. 6B, the sludge-containing treatment water B in the siphon chamber 128 is pushed out from the air diffusion hole 126 or the treatment water inlet portion 127, so that a liquid level S2 of the siphon chamber 128 descends gradually.

Figure 6C:
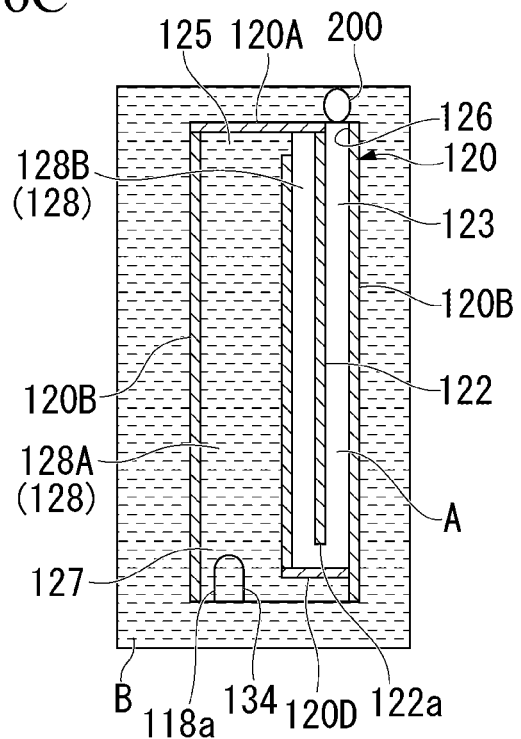
FIG. 6C is a sectional view describing the operation mechanism of the air diffusion device.
Figure 6D:
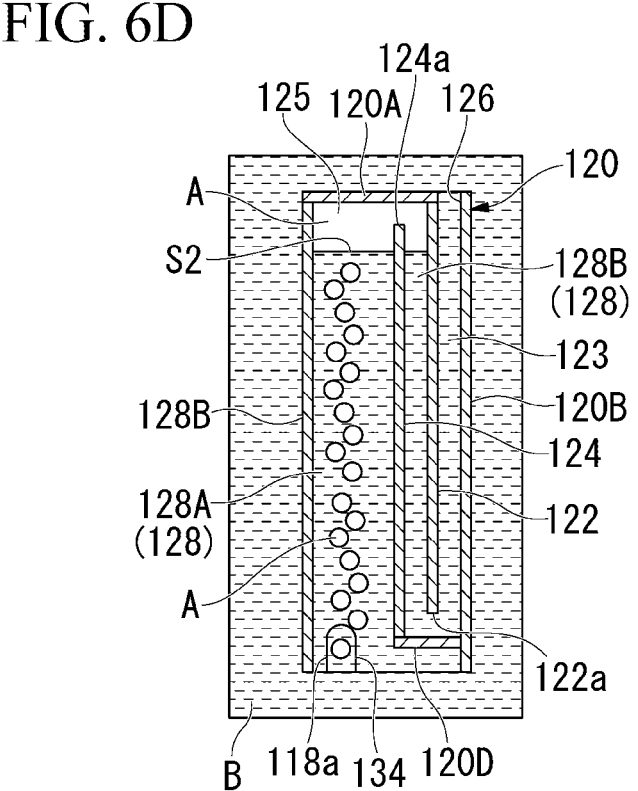
FIG. 6D is a sectional view describing the operation mechanism of the air diffusion device.

When the supply of the air A is further continued and the height of the liquid level S2 becomes lower than the lower end 122a of the first partition wall 122, as illustrated in FIG. 6C, the air A moves to the path 123 due to a difference in height between two air-liquid interfaces in the path 123 and the first siphon chamber 128A to be released from the air diffusion hole 126 all at one, so that a bubble 200 is formed. When the air is diffused from the air diffusion hole 126, as illustrated in FIG. 6D, the sludge-containing treatment water B flows into the siphon-type air diffusion pipe 120 from the treatment water inlet portion 127, so that the height of the liquid level S2 rises to the vicinity of the upper end 124a of the second partition wall 124. Then, the states illustrated from FIG. 6B to FIG. 6D are repeatedly performed, so that aeration occurs intermittently.

When the operation is stopped, in general, since the vicinity of the blower 115 is not highly airtight, the air A in the air storage portion 140 flows backward from the air supply portion 142 and, as illustrated in FIG. 7B, the water level S1 in the air storage portion 140 rises to the air supply port 142a of the air supply portion 142. In the header 114, since the air feeding port 144a of the air feeding portion 144 is positioned higher than the air supply port 142a of the air supply portion 142, even when the operation is stopped, the air feeding port 144a of the air feeding portion 144 is in the state of being separated from the water level S1. For this reason, even when the stop and the resuming of the operation are repeated, sludge is prevented from infiltrating into the air diffusion device 112 from the air feeding portion 144.

[Water Treatment Method]

Hereinafter, a water treatment method using the water treatment device 1000 described above will be described.

The water treatment method of the embodiment includes an activated sludge treatment step of performing an activated sludge treatment on raw water using activated sludge, and a membrane separation step of performing membrane separation of sludge-containing treatment water obtained by the activated. sludge treatment step.

(Activated Sludge Treatment Step)

In the water treatment method using the water treatment device 1000, wastewater (raw water) such as industrial wastewater or domestic wastewater discharged from factories or households is caused to flow into the activated sludge treatment tank 11 through the first flow passage 12, and is subjected to the activated sludge treatment in the activated sludge treatment tank 11 to turn into biological treatment water. The sludge-containing treatment water (target treatment water) obtained after the treatment is caused to flow into the membrane separation tank 21 through the second flow passage 13.

(Membrane Separation Step)

In the membrane separation tank 21, the membrane modules 22 of the MBR device 100 perform the membrane separation treatment on the sludge-containing treatment water (target treatment water) containing the activated sludge and the biological treatment water. During the membrane separation treatment, aeration is performed by the header-equipped air diffusion device 110.

A part of the sludge-containing treatment water B is returned from the membrane separation tank 21 to the activated sludge treatment tank 11 by the sludge returning unit 30. Treatment water obtained after performing membrane separation of the sludge-containing treatment water B using the membrane modules 22 is fed to the treatment water tank 41 through the third flow passage 33 to be stored therein. The treatment water stored in the treatment water tank 41 can be reused as industrial water or can be released to rivers or the like.

Incidentally, in the water treatment method, the activated sludge treatment step and the membrane separation step may be performed at the same time using the water treatment device in which the MBR device 100 is provided in the activated sludge treatment tank 11.

As described above, in the invention, the header-equipped air diffusion device is used which includes the header where the positional relationship between the air feeding port and the air supply port is controlled such that the position of the air feeding port of the air feeding portion in the height direction is higher than that of the air supply port of the air supply portion in the air storage portion. Accordingly, even when the operation and the stop are repeated, sludge is prevented from infiltrating into the air diffusion device from the header; and thereby, the operation can be more stably performed.

In addition, since the header-equipped air diffusion device of the invention includes the header, when the operation is stopped, air is in the state of being stored in the air diffusion device; and thereby, it is also prevented that sludge infiltrates into the air diffusion device from the air diffusion hole to cause clogging.

Incidentally, the header-equipped air diffusion device of the invention is not limited to the header-equipped air diffusion device 110 described above.

Figure 8:
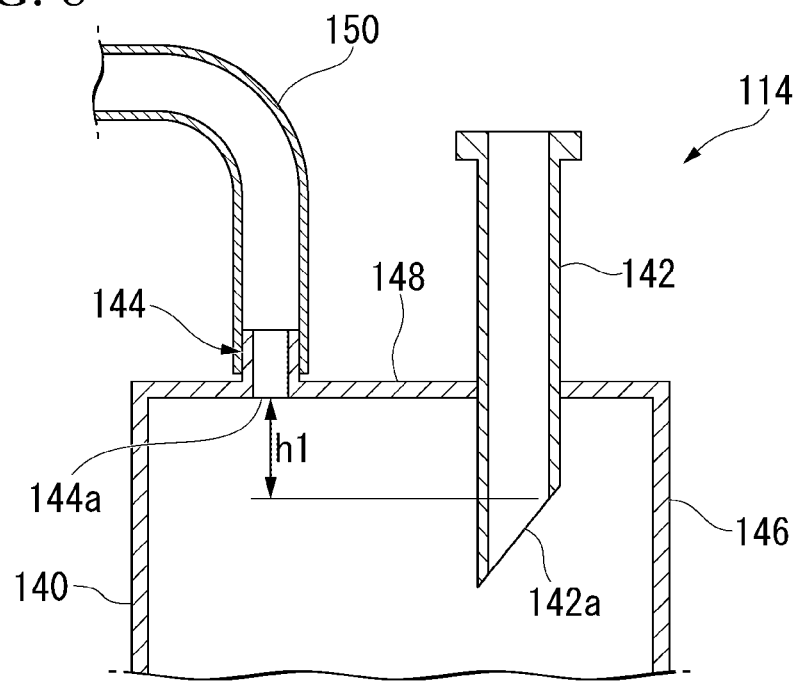
FIG. 8 is a sectional view illustrating another example of the header of the header-equipped air diffusion device of the invention.

For example, as illustrated in FIG. 8, the air supply port 142a of the air supply portion 142 in the header 114 may be formed to be obliquely inclined with respect to the horizontal direction.

Two or more air supply ports which are open in the air storage portion may be formed in the air supply portion. For example, as illustrated in FIG. 9, in addition to the air supply port 142a formed at the lower end of the air supply portion 142, an air supply port 142b may be further formed in a side wall close to the lower end of the air supply portion 142.

Figure 10:
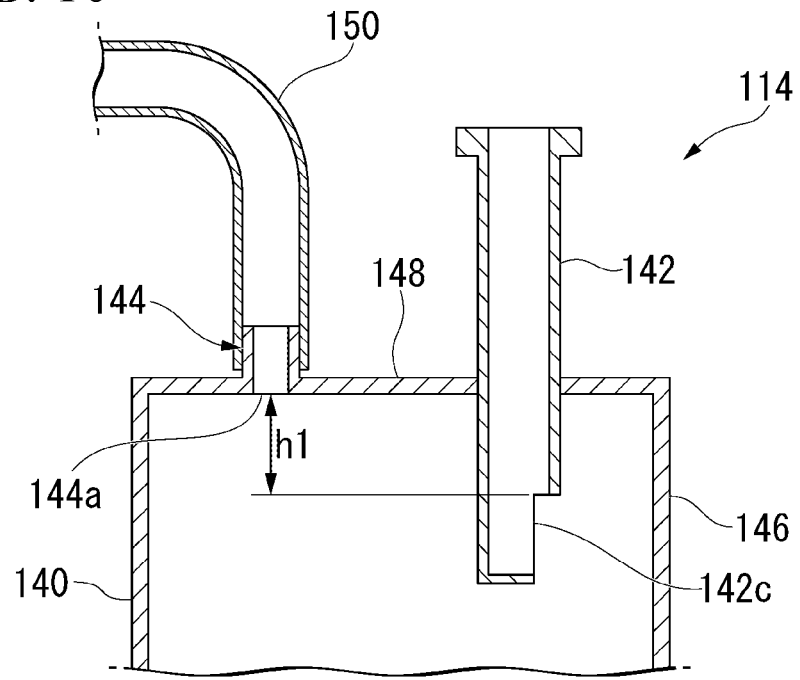
FIG. 10 is a sectional view illustrating another example of the header of the header-equipped air diffusion device of the invention.

As illustrated in FIG. 10, instead of that the air supply port 142a is formed at the lower end of the air supply portion 142, an air supply port 142c may be formed in the side wall close to the lower end of the air supply portion 142.

Figure 11:
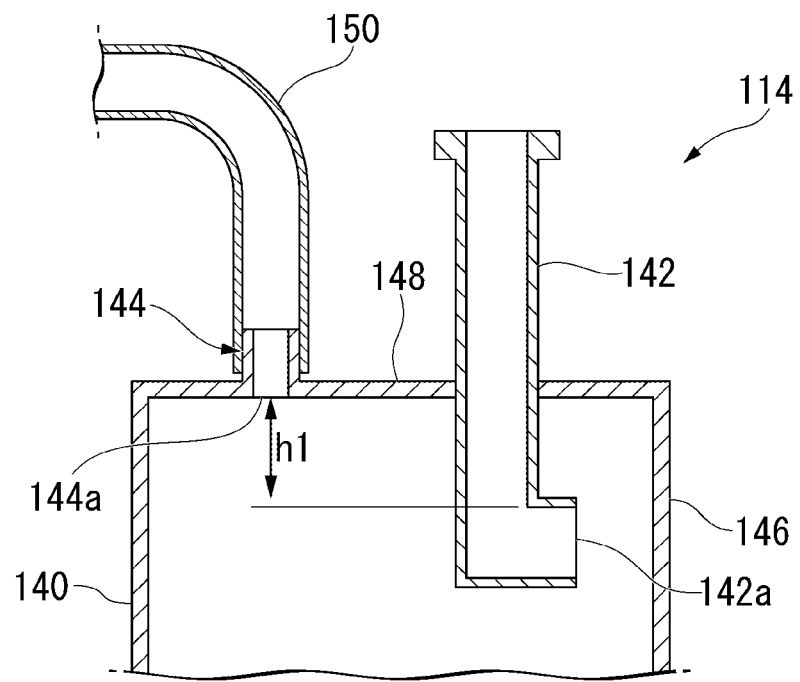
FIG. 11 is a sectional view illustrating another example of the header of the header-equipped air diffusion device of the invention.

As illustrated in FIG. 11, a portion close to the lower end of the air supply portion 142 may be bent, so that the air supply port 142a is open laterally.

Figure 9:
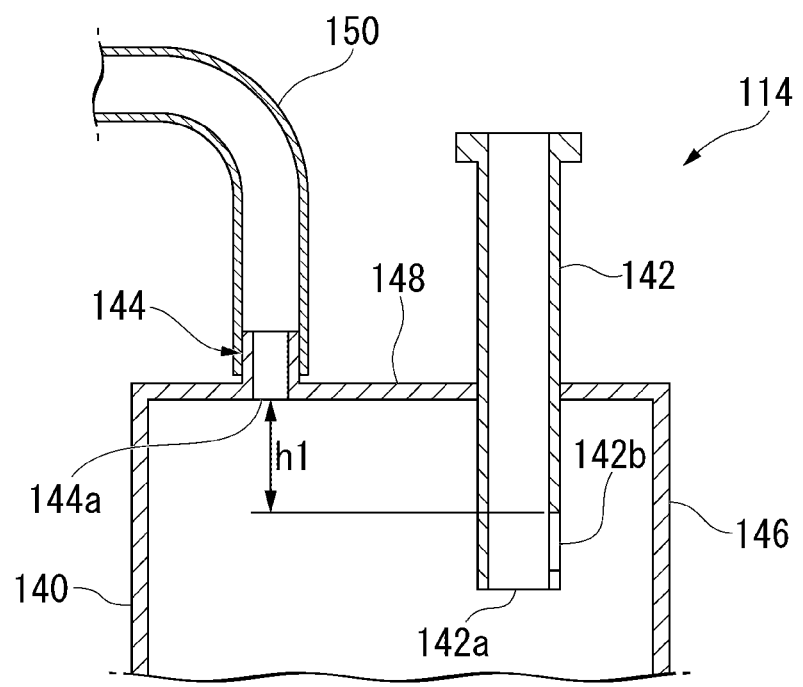
FIG. 9 is a sectional view illustrating another example of the header of the header-equipped air diffusion device of the invention.

As illustrated in FIGS. 9 to 11, when the air supply port of the air supply portion, the air supply port being open in the air storage portion, is not open downward, it is preferable that the air supply port of the air supply portion is open on an opposite side from the air feeding portion. Accordingly, when the operation is resumed after the operation is stopped, sludge is less likely to be scattered from the air supply portion toward the air feeding portion, and sludge is easily prevented from infiltrating into the air diffusion device from the header.

Figure 12:
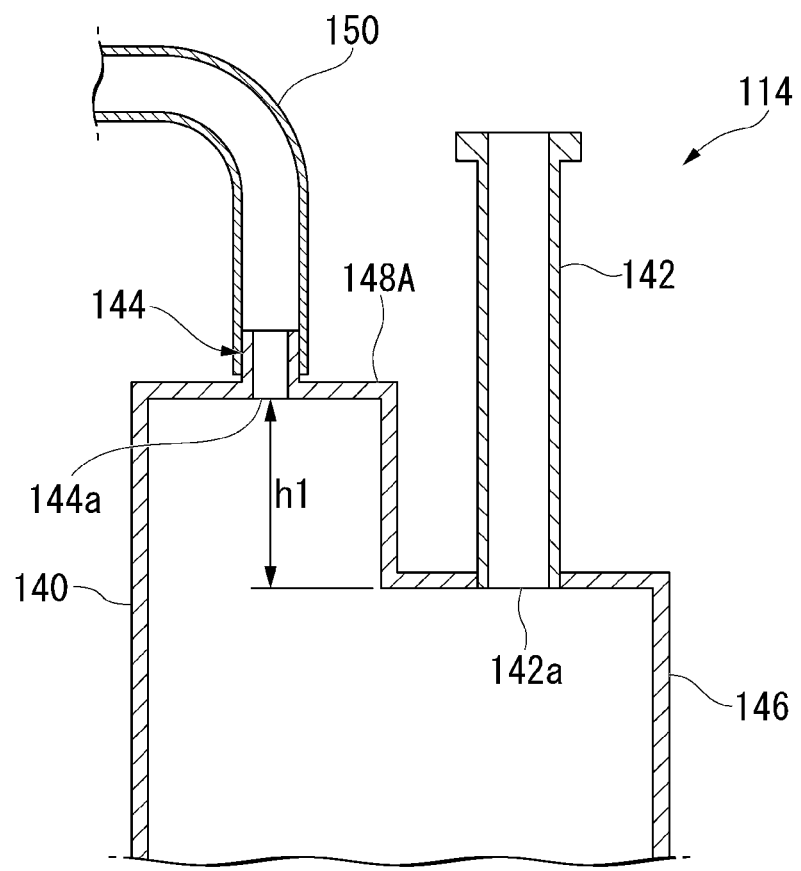
FIG. 12 is a sectional view illustrating another example of the header of the header-equipped air diffusion device of the invention.

When the air feeding port of the air feeding portion is positioned higher than the air supply port of the air supply portion in the air storage portion, a mode where the air supply port is not inserted into the air storage portion may be adopted. For example, as illustrated in FIG. 12, the header 114 may be configured such that the air feeding portion 144 is provided in an upper portion of the upper plate portion 148 where a step is formed and the air supply portion 142 is provided in a lower portion not to be inserted into the air storage portion 140.

When the air feeding port of the air feeding portion is positioned higher than the air supply port of the air supply portion in the air storage portion, the air feeding portion may be provided such that a part of the air feeding portion is inserted into the air storage portion. When the air feeding port of the air feeding portion is positioned higher than the air supply port of the air supply portion in the air storage portion, the air supply port or the air feeding port may be provided in an upper portion of the trunk portion in the air storage portion.

The air storage portion is not limited to a configuration where the target treatment water-inlet port is formed at a lower end thereof. The air storage portion may be configured such that the target treatment water-inlet port is formed below the air supply port of the air supply portion and the air feeding port of the air feeding portion in the trunk portion.

The header-equipped air diffusion device may be configured such that the air feeding portion of the header and the horizontal pipe of the air diffusion device are connected to each other via a connection pipe having no flexibility such as a pipe made of a metal. In this case, the air feeding portion and the connection pipe may be integrally made of the same material.

The number of the air supply portions and the air feeding portions provided in the header is not limited to one. For example, the header-equipped air diffusion device may be configured to include a header eluding one air supply portion and two or more air feeding portions and to feed air from the header to two or more air diffusion devices.

Figure 13:
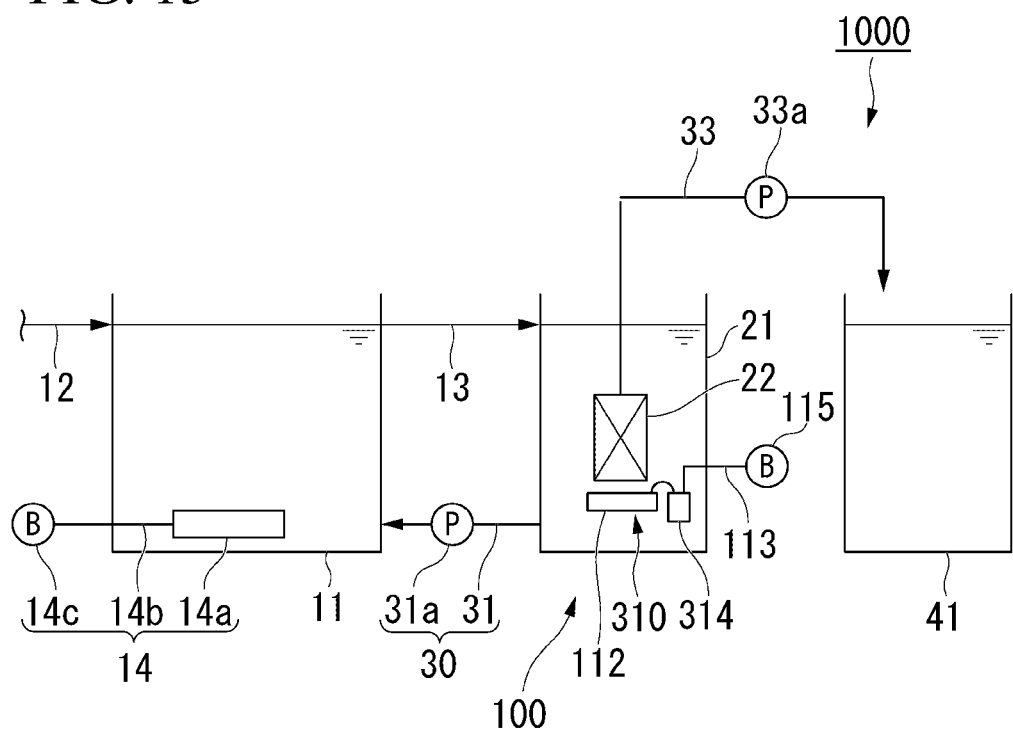
FIG. 13 is a schematic diagram illustrating another example of the water treatment device.
Figure 14:
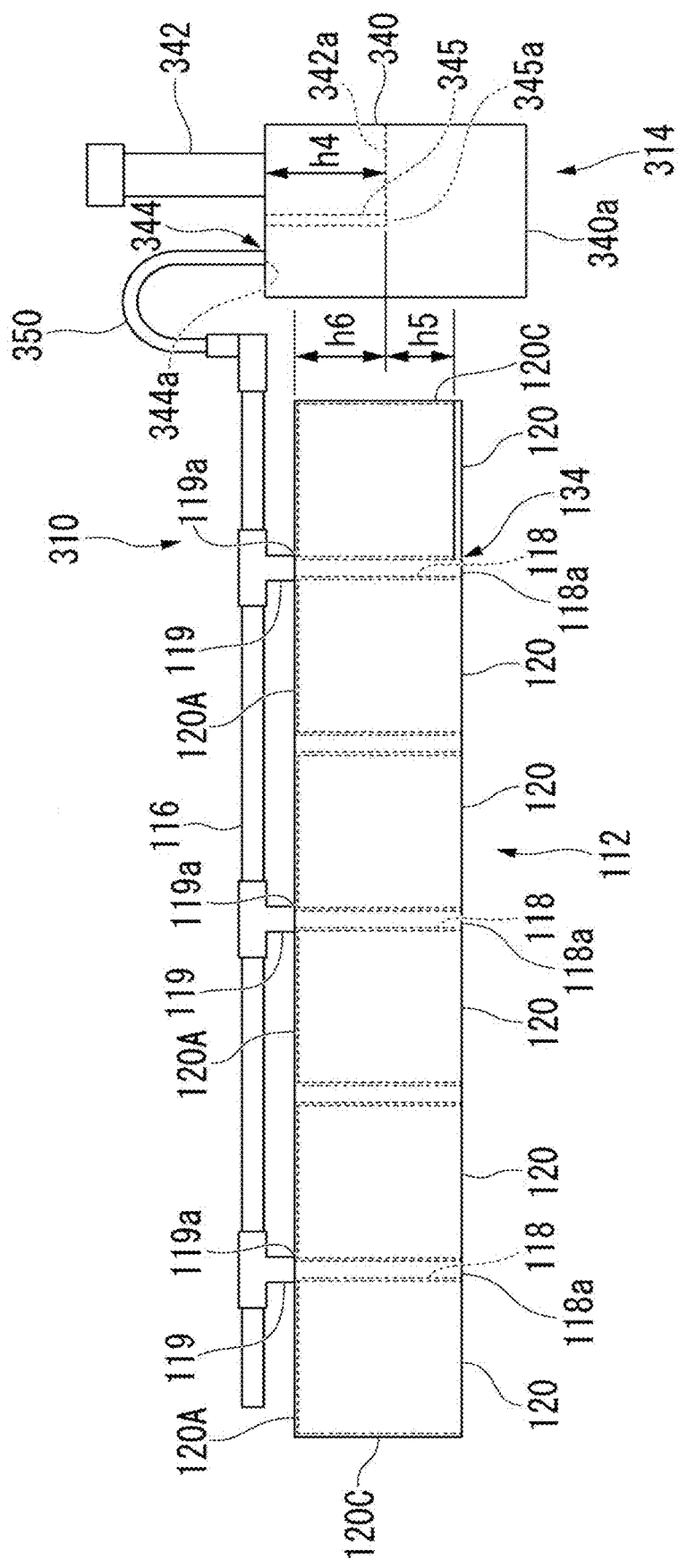
FIG. 14 is a front view illustrating another example of the header-equipped air diffusion device of the invention.

The header-equipped air diffusion device of the invention may be a header-equipped air diffusion device 310 illustrated as an exemplary example in FIGS. 13 and 14. In the header-equipped air diffusion device 310, the same reference signs are assigned to the same portions as those of the header-equipped air diffusion device 110, and descriptions thereof will be omitted.

The header-equipped air diffusion device 310 includes the air diffusion device 112 and a header 314 provided upstream of the air diffusion device 112. Both of the air diffusion device 112 and the header 314 are provided in the membrane separation tank 21 in a state where the both are immersed in the sludge-containing treatment water (target treatment water).

Figure 15:
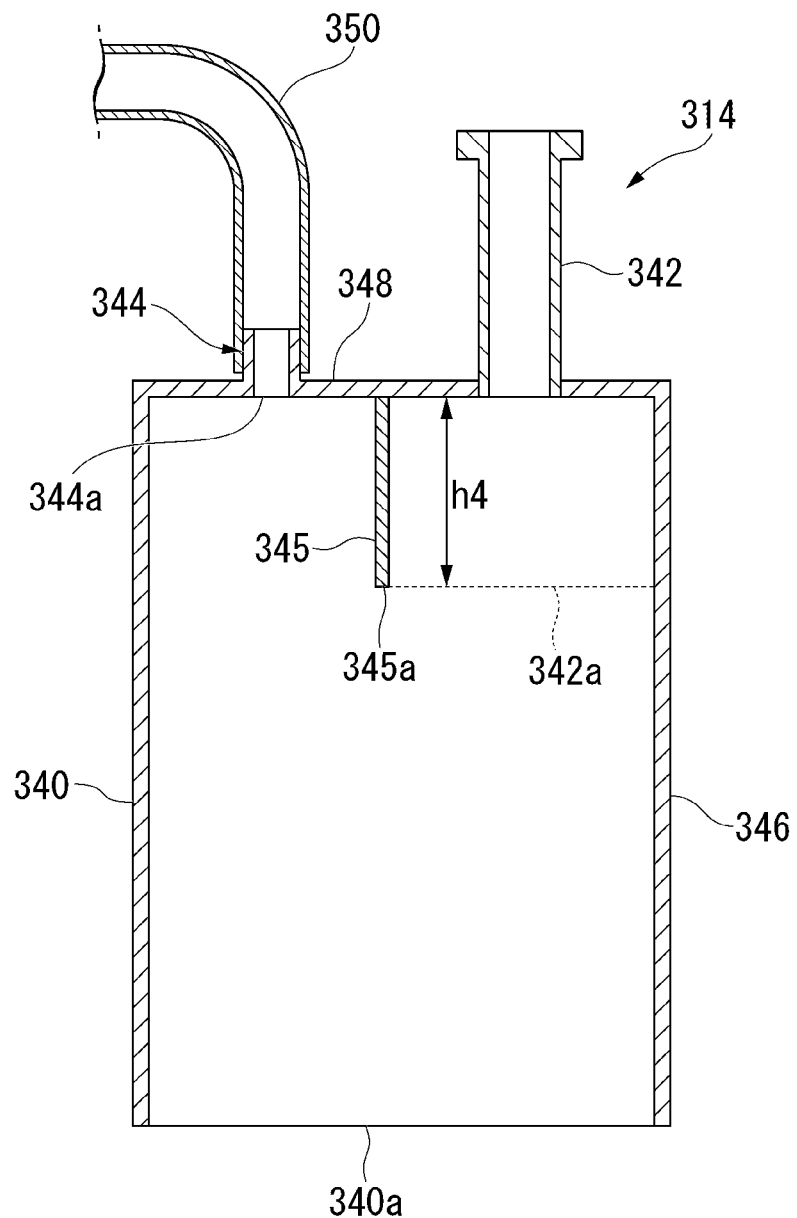
FIG. 15 is a sectional view of a header in the header-equipped air diffusion device of FIG. 14.

As illustrated in FIGS. 14 and 15, the header 314 includes an air storage portion 340, an air supply portion 342, an air feeding portion 344, and a partition portion 345.

The air storage portion 340 is a portion that stores air, and includes a trunk portion 346 having a cylindrical shape and an upper plate portion 348 provided to close an upper opening end of the trunk portion 346. A lower end side of the trunk portion 346 in the air storage portion 340 is open. Namely, a target treatment water-inlet port 340a is formed in a lower portion of the air storage portion 340.

The shape of the air storage portion 340 is not specifically limited, and examples of the shape include a circular cylinder shape, a polygonal cylinder shape, and the like.

Similar to the air storage portion 140, the cross-sectional area of an air storage portion obtained when the air storage portion 340 is cut in the horizontal direction is preferably 10,000 mm$^2$ or greater, and more preferably from 20,000 mm$^2$ to 1,000,000 mm$^2$.

In the header 314, the air supply portion 342 and the air feeding portion 344 are provided to protrude upward from the upper plate portion 348 of the air storage portion 340. As described above, the air supply portion 342 and the air feeding portion 344 are provided in an upper portion of the air storage portion 340. In addition, the partition portion 345 is provided in the air storage portion 340 to extend downward from the upper plate portion 348 and to partition an upper portion in the air storage portion 340 into an air supply portion 342 side and an air feeding portion 344 side. In this mode, a cylindrical portion which is formed by the partition portion 345, the upper plate portion 348 of the air storage portion 340, and a part of the trunk portion 346 on an opposite side from the air feeding portion 344 serves as a part of the air supply portion 342. Then, an opening end on the air supply portion 342 side at a lower end 345a of the partition portion 345 serves as an air supply port 342a. As described above, a mode where a part of the air storage portion 340 serves also as a part of the air supply portion 342 is adopted.

In the header 314, the air supply portion 342 is provided on a side of the air storage portion 340, which is farther from the air diffusion device 112 than the air feeding portion 344. Accordingly, the layout becomes simpler and the header-equipped air diffusion device 310 becomes more compact.

The air supply portion 342 is provided in a cylindrical shape to protrude upward from the upper plate portion 348 of the air storage portion 340. The air supply portion 342 is connected to the blower 115 via the pipe 113. Accordingly, air which is fed from the blower 115 through the pipe 113 is fed into the air storage portion 340 from the air supply portion 342.

The shape of the air supply portion 342 is not specifically limited, and examples of the shape include a circular cylinder shape, a polygonal cylinder shape, and the like.

The flow passage cross-sectional area of the air supply portion 342 is preferably 2,000 mm$^2$ or greater, and more preferably from 3,000 mm$^2$ to 8,000 mm$^2$. When the flow passage cross-sectional area of the air supply portion 342 is the lower limit value of the above-described range or greater, the air supply portion 342 is less likely to be blocked by sludge. When the flow passage cross-sectional area of the air supply portion 342 is the upper limit value of the above-described range or less, the air diffusion device 112 becomes compact, which is preferable.

Incidentally, the flow passage cross-sectional area of the air supply portion 342 is the minimum value of the area of a flow passage cross-section obtained when the air supply portion 342 is cut in a direction perpendicular to a longitudinal direction of a flow passage in the air supply portion 342.

The air feeding portion 344 is a portion through which air in the air storage portion 340 is fed out, and is provided in a cylindrical shape to protrude upward from the upper plate portion 348 of the air storage portion 340. The air feeding portion 344 of the header 314 is connected to the horizontal pipe 116 of the air diffusion device 112 via the connection pipe 350. Accordingly, air stored in the air storage portion 340 is fed to the horizontal pipe 116 of the air diffusion device 112 from the air feeding portion 344.

The same mode as that of the air feeding portion 144 can be provided as an example of a mode of the air feeding portion 344, and exemplary modes also are the same.

The partition portion 345 is a flat plate-shaped member, and is provided to hang down from the upper plate portion 348 such that the upper portion in the air storage portion 340 is partitioned into the air supply portion 342 side and the air feeding portion 344 side. Since the upper portion in the air storage portion 340 is partitioned by the partition portion 345 as described above, and an air feeding port 344a of the air feeding portion 344 is positioned higher than the air supply port 342a of the air supply portion 342, it is prevented that sludge infiltrates into the horizontal pipe 116 of the air diffusion device 112 from the air storage portion 340 and the horizontal pipe 116 or the connection pipe portion 119 is clogged by the sludge.

Figure 16A:
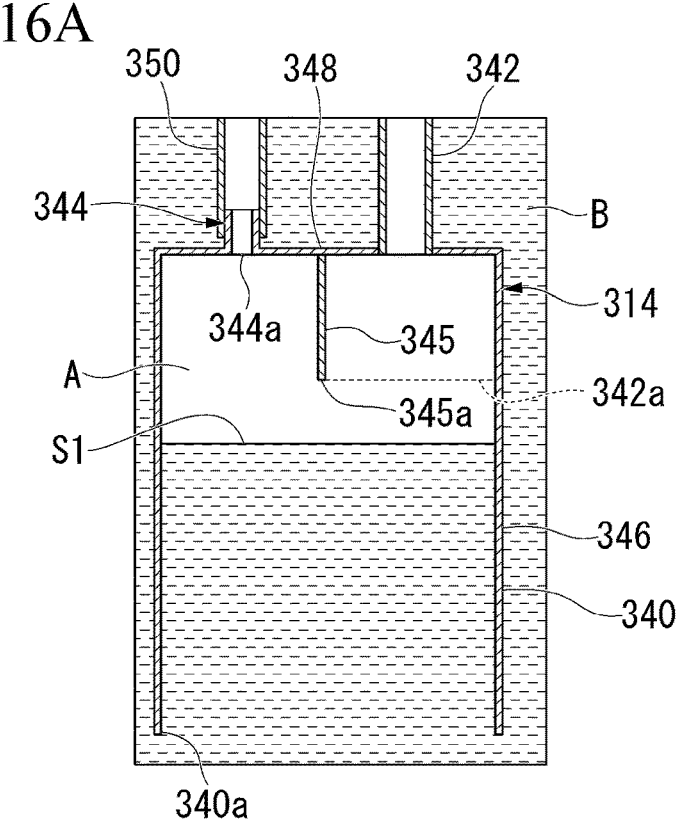
FIG. 16A is a sectional view describing an operation mechanism of the header.
Figure 16B:
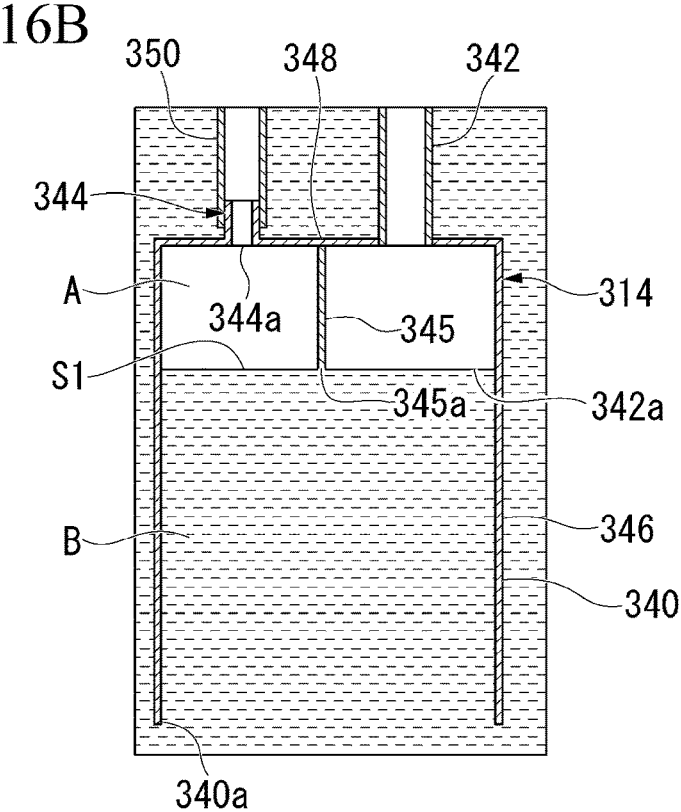
FIG. 16B is a sectional view describing the operation mechanism of the header.

In the header-equipped air diffusion device 310, when the operation is stopped, as illustrated in FIG. 16B, while air stored in the air storage portion 340 flows backward from the air supply portion 342, the sludge-containing treatment water B (target treatment water) flows into the air storage portion 340 from the target treatment water-inlet port 340a at the lower end, so that the water level S1 in the air storage portion 340 rises. Then, in the header 314, when the water level S1 reaches the lower end 345a of the partition portion 345, namely, reaches the air supply port 342a, the rise of the water level S1 stops, and the air A remains stored on the air feeding portion 344 side of the partition portion 345 in the upper portion of the air storage portion 340 and inside the air diffusion device 112.

As described above, in the header-equipped air diffusion device 310, since the upper portion in the air storage portion 340 is partitioned by the partition portion 345, and the air feeding port 344a of the air feeding portion 344 is positioned higher than the air supply port 342a of the air supply portion 342, when the operation is stopped, the air feeding port 344a of the air feeding portion 344 is in the state of being separated from the water level S1. Namely, even in a state where the operation is stopped, the sludge-containing treatment water B does not reach the air feeding portion 344 in the air storage portion 340, For this reason, even when the operation is resumed, sludge is less likely to infiltrate into the air diffusion device 112 from the air feeding portion 344; and thereby, the horizontal pipe 116 or the like is prevented from being clogged by dry sludge.

A height h4 of the partition portion 345 is preferably 50 mm or greater, more preferably from 50 mm to 500 mm, and further preferably from 100 mm to 300 mm, When the height h4 of the partition portion 345 is the lower limit value of the above-described range or greater, sludge is easily prevented from infiltrating into the air diffusion device 112 from the header 314. When the height h4 of the partition portion 345 is the upper limit value of the above-described range or less, the air diffusion device 112 becomes compact, which is preferable.

Incidentally, the height of the partition portion represents a distance between an upper end and the lower end of the partition portion in the height direction. In this mode, the position of the lower end of the partition portion and the position of the air supply port of the air supply portion in the height direction coincide with each other, For this reason, the height of the partition portion coincides with a difference in height between the air feeding port of the air feeding portion and the air supply port of the air supply portion.

The lower end 345a of the partition portion 345 and the air supply port 342a in the header 314 are positioned higher than the opening portion 118a of the distribution portion 118 in the air diffusion device 112. In the embodiment, when the air diffusion device is provided which has a mode where the distribution portion extending downward from the horizontal pipe is provided, it is preferable that the position of the lower end of the partition portion and the position of the air supply port in the header in the height direction is the same as the position of the opening portion of the distribution portion or is higher therethan. Accordingly, when the operation is stopped, the rise of the water level in the air storage portion stops when the water level reaches the lower end of the partition portion; and thereby, it is possible to easily obtain a sufficient effect of preventing sludge from infiltrating into the air diffusion device from the header.

Incidentally, in the embodiment, when the opening portion of the distribution portion is not open downward, a positional relationship in the height direction between the lower end of the partition portion or the air supply port and the opening portion of the distribution portion is based on the upper end of the opening portion.

A difference h5 in height between the lower end 345a of the partition portion 345 or the air supply port 342a and the opening portion 118a of the distribution portion 118 is preferably from 5 mm to 200 mm, and more preferably from 10 mm to 180 mm. When the difference h5 is the lower limit value of the above-described range or greater, sludge is easily prevented from infiltrating into the air diffusion device 112 from the header 314. When the difference h5 is the upper limit value of the above-described range or less, the air diffusion device 112 becomes compact, which is preferable.

The lower end 345a of the partition portion 345 and the air supply port 342a in the header 314 are positioned lower than the lower end 119a of the connection pipe portion 119 of the air diffusion device 112. As described above, in the embodiment, when the air diffusion device is provided which has a mode where the horizontal pipe and the distribution portion are connected to each other via the connection pipe portion of which the flow passage cross-sectional area is smaller than that of the distribution portion, it is preferable that the lower end of the partition portion and the air supply port in the header are positioned higher than the lower end of the connection pipe portion. Accordingly, sludge is easily prevented from clogging, the connection pipe portion.

A difference h6 in height between the lower end 345a of the partition portion 345 or the air supply port 342a and the lower end 119a of the connection pipe portion 119 is preferably 50 mm or greater, and more preferably from 100 mm to 180 mm. When the difference h6 is the lower limit value of the above-described range or greater, the connection pipe portion 119 is easily prevented from being clogged by sludge. When the difference h6 is the upper limit value of the above-described range or less, the air diffusion device 112 becomes compact, which is preferable.

The thickness of the partition portion 345 having a plate shape can be appropriately set, for example, can be set to be from 2 mm to 10 mm.

Hereinafter, an operation mechanism of the header-equipped air diffusion device 310 will be described.

Before the operation is started, similar to the header-equipped air diffusion device 110, the siphon chamber 128, the communication portion 125, and the path 123 in the siphon-type air diffusion pipe 120 are filled with the sludge-containing treatment water B (target treatment water). Air is fed from the blower 115 through the pipe 113 and, as illustrated in FIG. 16A, the air A is feed into the air storage portion 340 from the air supply portion 342. While the air A is temporarily stored in the air storage portion 340 to push down the water level S1 below the lower end 345a of the partition portion 345 in the header 314, a part of the air A is fed to the horizontal pipe 116 of the air diffusion device 112 from the air feeding portion 344 through the connection pipe 350.

The air fed to the horizontal pipe 116 is distributed to each of the distribution portions 118 to be fed to the siphon-type air diffusion pipe 120 from the treatment water inlet portion 127 through the opening portion 118a of the distribution portion 118. Accordingly, aeration is intermittently performed in the same mechanism as that of the header-equipped air diffusion device 110.

When the operation is stopped, in general, since the vicinity of the blower 115 is not highly airtight, the sludge-containing treatment water B flows into the air storage portion 340 from the target treatment water-inlet port 340a, and the air A in the air storage portion 340 flows backward from the air supply portion 342. Then, as illustrated in FIG. 16B, the water level S1 in the air storage portion 340 rises to the lower end 345a of the partition portion 345. In the header 314, even when the operation is stopped, the rise of the water level S1 stops when the water level S1 reaches the lower end 345a of the partition portion 345, namely, reaches the air supply port 342a, and the air feeding port 344a of the air feeding portion 344 is in the state of being separated from the water level S1. For this reason, even when the stop and the resuming of the operation are repeated, sludge is prevented from infiltrating into the air diffusion device 112 from the air feeding portion 344.

As described above, in the embodiment, the header-equipped air diffusion device is used which includes the header in which the air feeding port of the air feeding portion is positioned higher than the air supply port of the air supply portion since the upper portion in the air storage portion is partitioned into the air supply portion side and the air feeding portion side by the partition portion. Accordingly, even when the operation and the stop are repeated, sludge is prevented from infiltrating into the air diffusion device from the header; and thereby, the operation can be more stably performed.

In addition, since the header-equipped air diffusion device of the embodiment also includes the header, when the operation is stopped, air is in the state of being stored in the air diffusion device; and thereby, it is also prevented that sludge infiltrates into the air diffusion device from the air diffusion hole to cause clogging.

Incidentally, the header-equipped air diffusion device including the partition portion is not limited to the header-equipped air diffusion device 310 described above.

Figure 17:
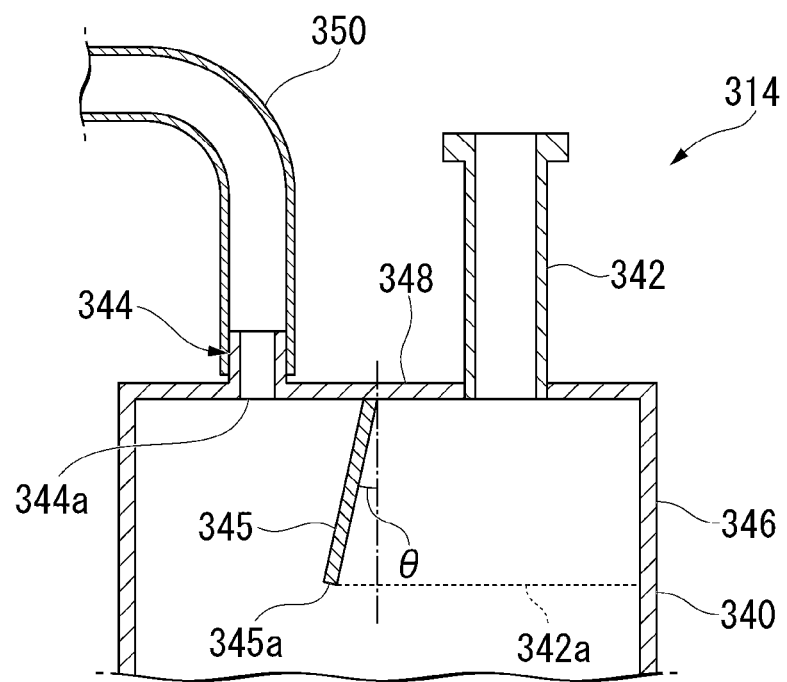
FIG. 17 is a sectional view illustrating another example of the header of the header-equipped air diffusion device of the invention.
Figure 18:
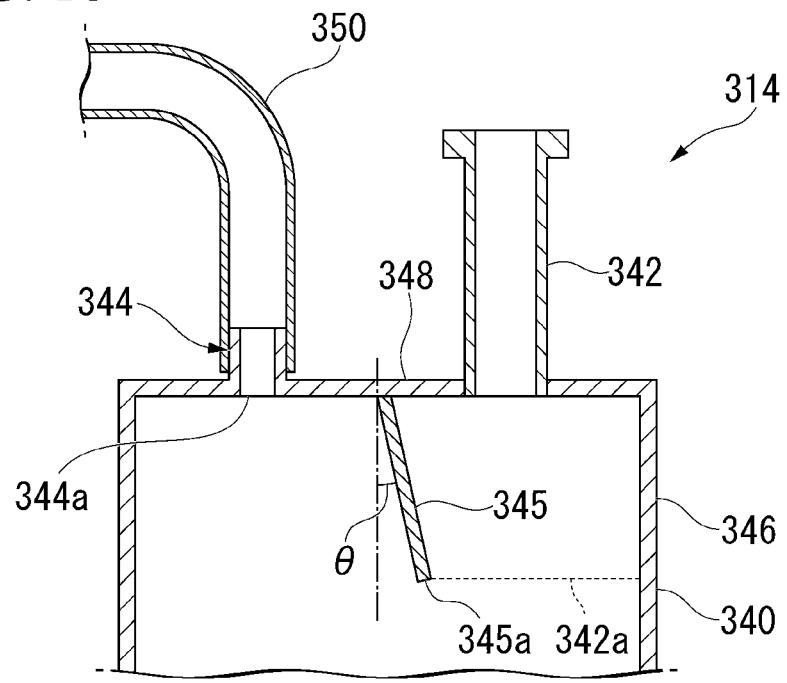
FIG. 18 is a sectional view illustrating another example of the header of the header-equipped air diffusion device of the invention.

For example, as illustrated in FIGS. 17 and 18, the partition portion 345 having a flat plate shape may be provided to be inclined toward the air supply portion 342 side or the air feeding portion 344 side. An angle θ of the partition portion 345 having a flat plate shape with respect to the vertical direction is preferably from 0° to 30°, and more preferably from 0° to 15°. When the angle θ is within the above-described range, it is possible to easily obtain the effect of preventing sludge from infiltrating into the air diffusion device from the header.

For example, the header-equipped air diffusion device may be configured to include one header including a plurality of the air feeding portions, and a plurality of the air diffusion devices and to feed air from the one header to the plurality of air diffusion devices.

Figure 19:
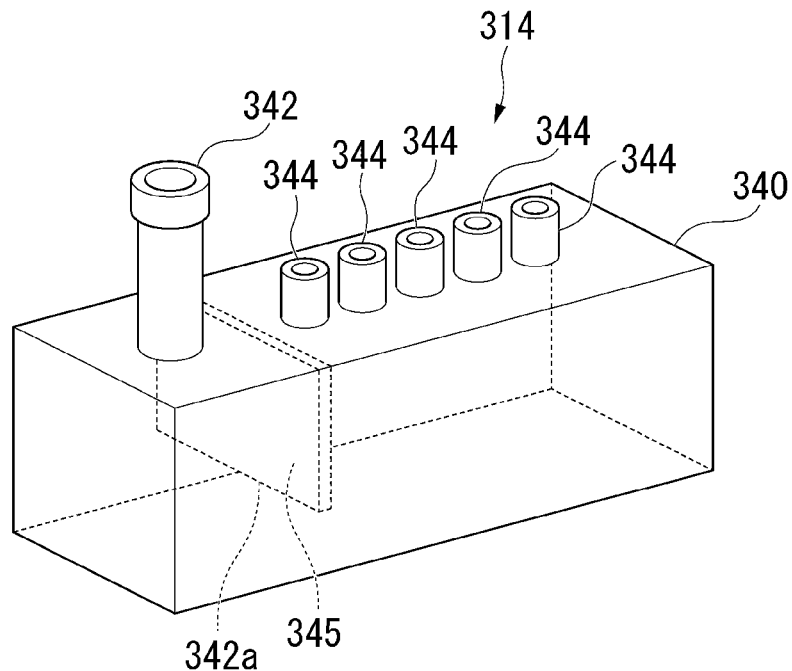
FIG. 19 is a perspective view illustrating another example of the header of the header-equipped air diffusion device of the invention.

For example, as illustrated in FIG. 19, the header-equipped air diffusion device may be configured to include the header 314 in which one air supply portion 342 and five air feeding portions 344 are provided side by side in a row in the upper portion of the air storage portion 340 having a rectangular parallelepiped shape in a plan view and the partition portion 345 is provided to partition the air feeding portion 344 closest to the air supply portion 342 off from the air supply portion 342 in the upper portion of the air storage portion 340.

Figure 20:
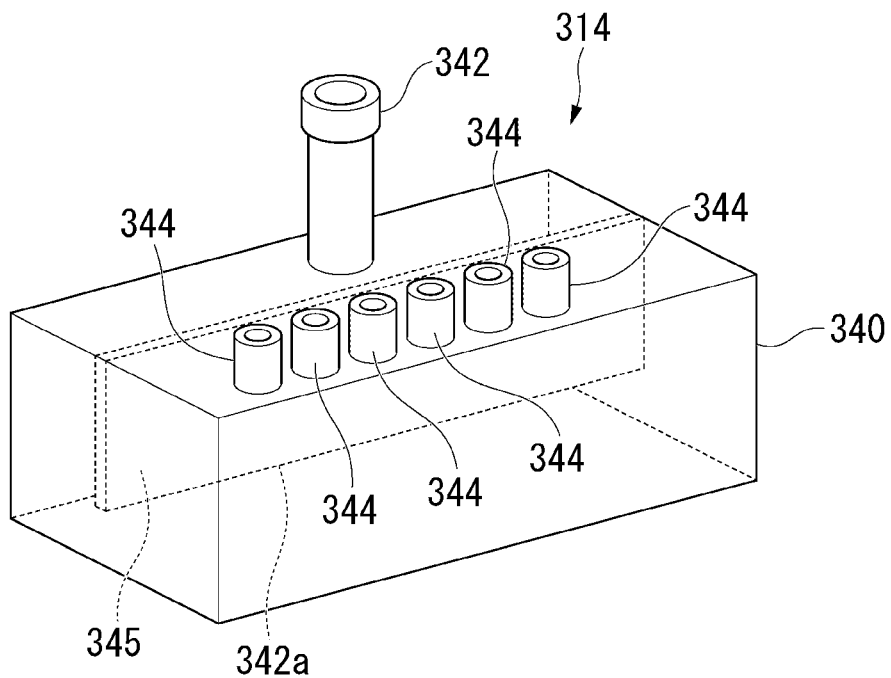
FIG. 20 is a perspective view illustrating another example of the header of the header-equipped air diffusion device of the invention.

As illustrated in FIG. 20, the header-equipped air diffusion device may be configured to include the header 314 in which one air supply portion 342 is provided on one side in a width direction of the header 314 and five air feeding portions 344 are provided side by side in a row in a longitudinal direction of the header 314 on the other side in the upper portion of the air storage portion 340 having a rectangular parallelepiped shape and the partition portion 345 is provided to partition the air supply portion 342 off from the five air feeding portions 344 in the upper portion of the air storage portion 340.

Figure 21:
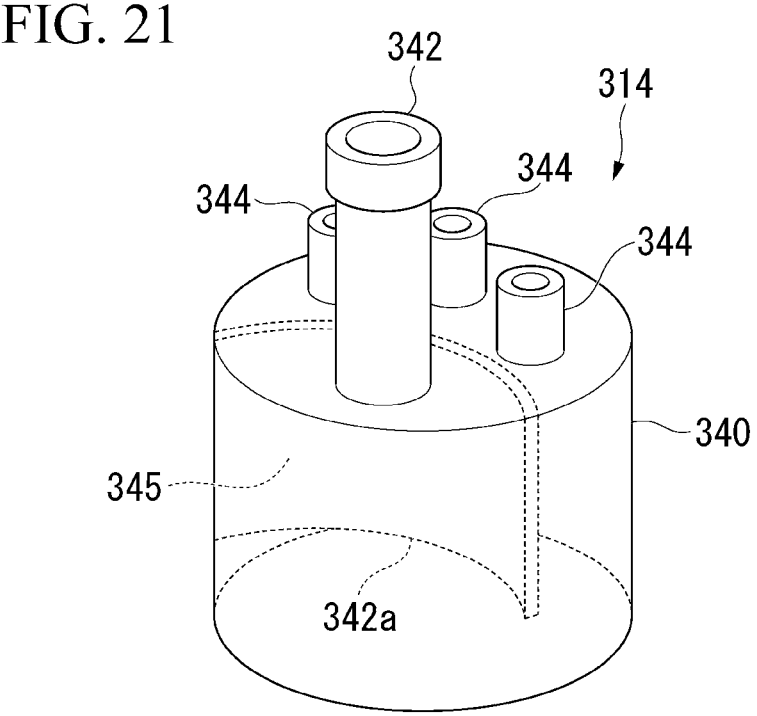
FIG. 21 is a perspective view illustrating another example of the header of the header-equipped air diffusion device of the invention.

When the partition portion 345 has a plat shape, the partition portion 345 may be curved or bent. For example, as illustrated in FIG. 21, the header-equipped air diffusion device may be configured to include the header 314 in which one air supply portion 342 and three air feeding portions 344 are provided in the upper portion of the air storage portion 340 having a circular cylinder shape and the partition portion 345 having a plate shape which is curved into an arc shape in a plan view is provided to partition the air supply portion 342 off from the three air feeding portions 344 in the upper portion of the air storage portion 340.

Figure 22:
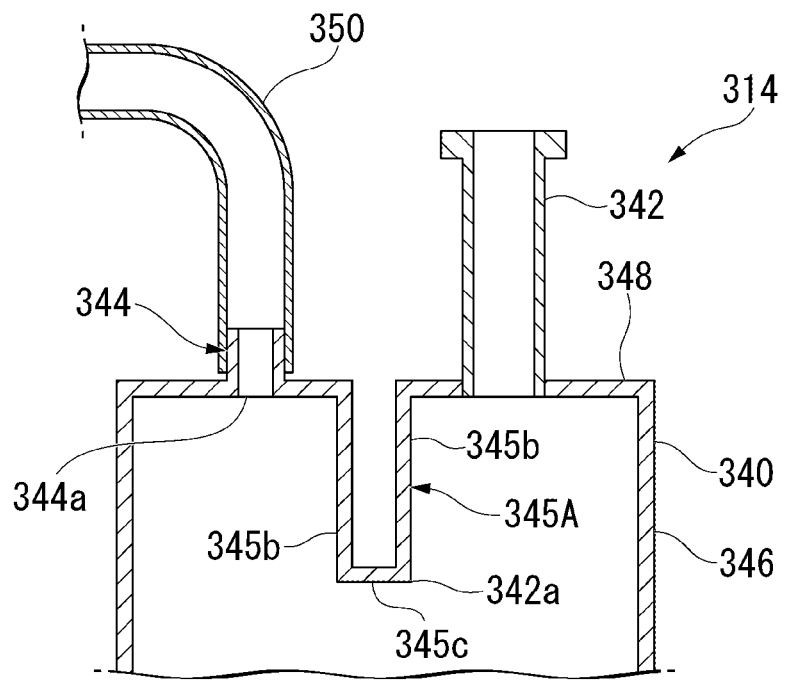
FIG. 22 is a sectional view illustrating another example of the header of the header-equipped air diffusion device of the invention.

The partition portion provided in the header is not limited to being one plate-shaped member as long as the partition portion can partition the upper portion in the air storage portion into the air supply portion side and the air feeding portion side. For example, as illustrated in FIG. 22, a portion between the air supply portion 342 and the air feeding portion 344 in the upper plate portion 348 of the air storage portion 340 may be a partition portion 345A that is provided to be recessed toward the inside of the air storage portion 340. The partition portion 345A is a projection including a pair of side plate portions 345b which extend downward from between the air supply portion 342 and the air feeding portion 344 in the upper plate portion 348 such that surfaces of the side plate portions 345b face each other, and a lower plate portion 345c connecting lower ends of the side plate portions 345b.

Figure 23:
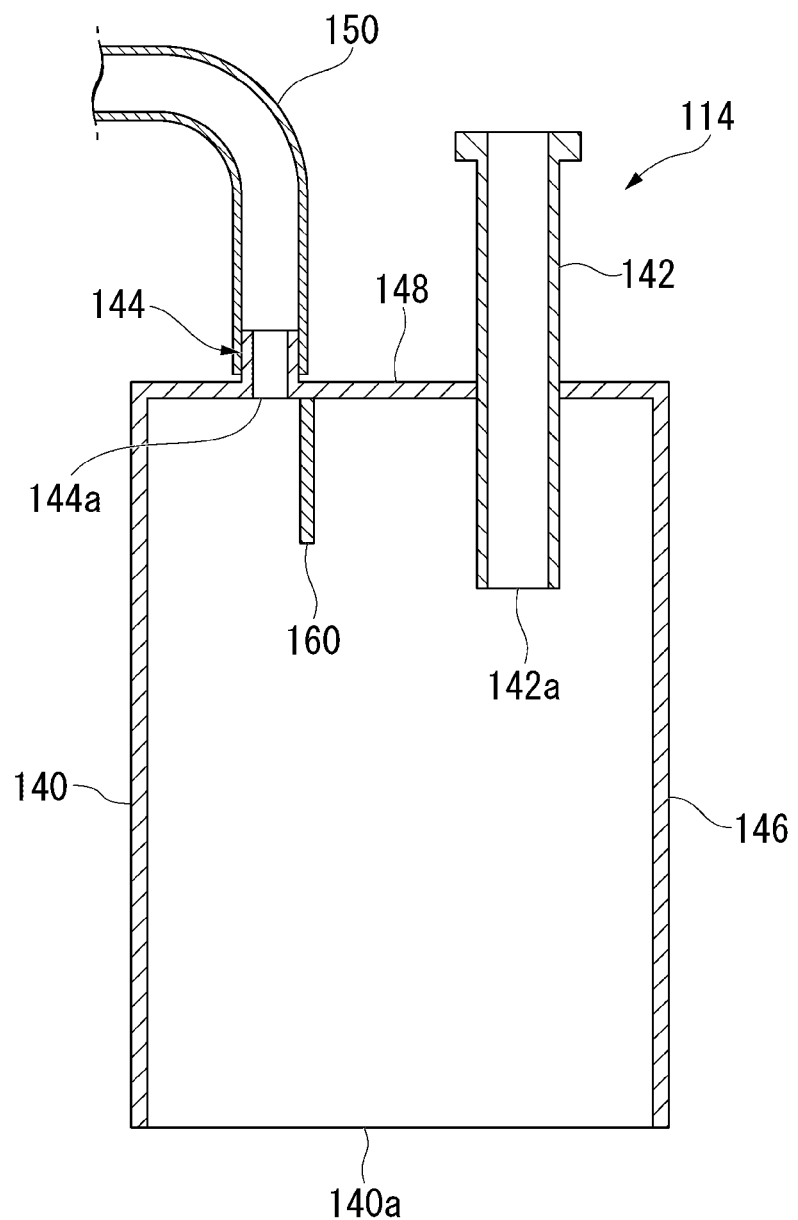
FIG. 23 is a sectional view illustrating another example of the header of the header-equipped air diffusion device of the invention.

As illustrated in FIG. 23, in the header 114, a shield plate 160 which shields scattering matter (target treatment water, sludge, or the like) scattered in the air storage portion 140 may be provided on an air supply port 142a side of the air feeding port 144a in the air storage portion 140. The shield plate 160 is provided to extend downward from a portion between the air feeding port 144a and the air supply portion 142 in the upper plate portion 148 of the air storage portion 140. Since the shield plate 160 is provided, when the operation is resumed after the operation is stopped, even if sludge is scattered toward the air feeding port 144a from the vicinity of the air supply port 142a, the sludge is easily prevented from infiltrating into the air diffusion device 112 from the header 114.

Figure 24:
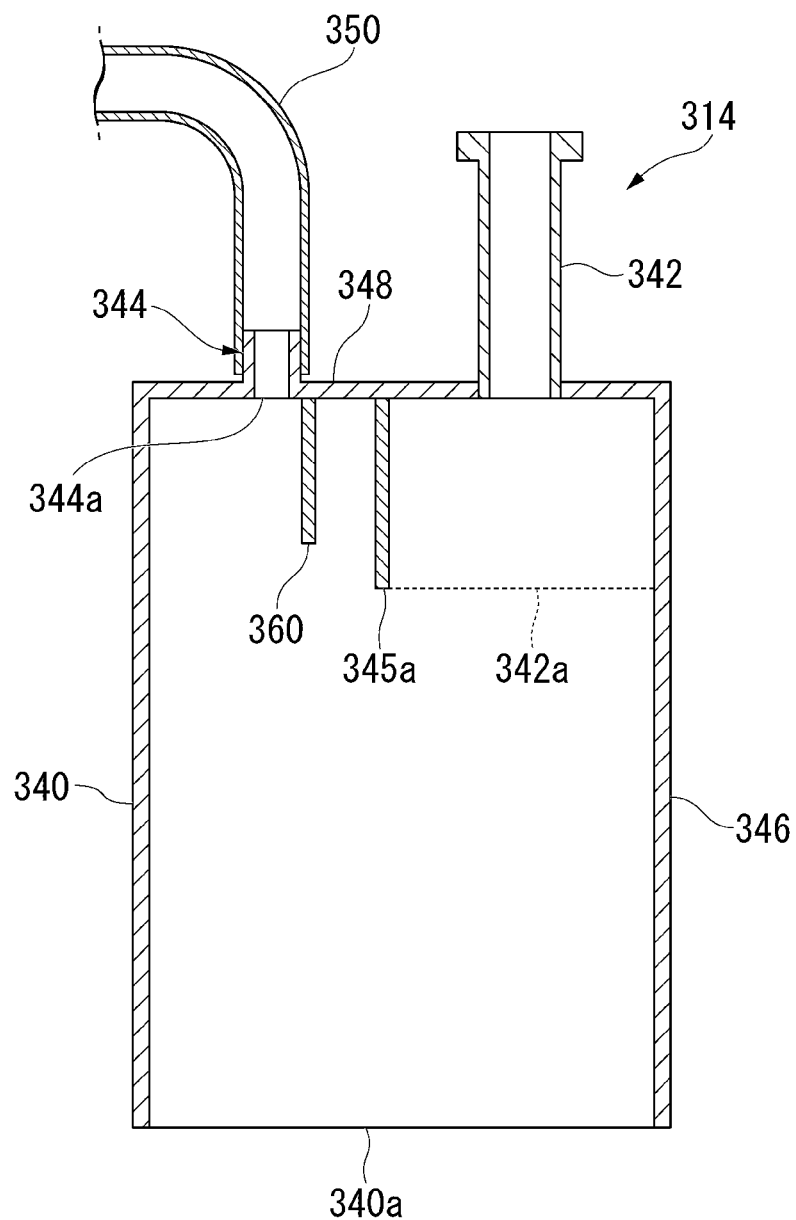
FIG. 24 is a sectional view illustrating another example of the header of the header-equipped air diffusion device of the invention.

As illustrated in FIG. 24, in the header 314, a shield plate 360 extending downward from the upper plate portion 348 may be provided between the air feeding port 344a and the partition portion 345, namely, on an air supply port 342a side of the air feeding port 344a in the air storage portion 340.

Incidentally, as long as the shied plate can prevent scattering matter (target treatment water, sludge, or the like) from entering the air feeding portion from the air feeding port, the shield plate may be inclined toward the air feeding port side or the air supply port side with respect to the vertical direction or may extend from the trunk portion of the air storage portion in the horizontal direction below the air feeding port.

The air diffusion device provided in the header-equipped air diffusion device is not limited to the air diffusion device 112 described above.

The number of the siphon-type air diffusion pipes in the air diffusion device is not limited to six and can appropriately set depending, on the size and the number of the membrane modules. The number of the siphon-type air diffusion pipes may be five or less or may be seven or more.

In the air diffusion device 112, air is supplied from one distribution portion 118 to two siphon-type air diffusion pipes 120; however, air may be supplied from one distribution portion to one siphon-type air diffusion pipe, or air may be supplied from one distribution portion to three or more siphon-type air diffusion pipes therearound. The cutout portion 134 may not be formed in an end portion of the distribution portion 118.

The air diffusion device is not limited to including the siphon-type air diffusion pipe. For example, instead of that the air diffusion device 112 includes the siphon-type air diffusion pipe 120, the air diffusion device may be configured such that air is diffused from the opening portion 118a of the distribution portion 118. The air diffusion device may be configured such that a plurality of the air diffusion holes are formed in the horizontal pipe. The air diffusion device may be configured such that a distribution pipe extending in a direction orthogonal to the horizontal pipe in a plan view is connected to the horizontal pipe via the connection pipe portion and a plurality of the air diffusion holes are formed in the distribution pipe.

The header-equipped air diffusion device of the invention may have a mode where any two or more modes among the above-described modes are appropriately combined.

Hereinafter, the invention will be specifically described using examples; however, the invention is not limited to the following description.

Example 1

A header-equipped air diffusion device having the same configuration as that of the header-equipped air diffusion device 110 illustrated as an exemplary example in FIGS. 2 to 5 was produced. The difference h1 in height between the air feeding port 144a of the air feeding portion 144 and the air supply port 142a of the air supply portion 142 in the air storage portion 140 was set to 100 mm. The difference h2 in height between the air supply port 142a of the air supply portion 142 and the opening portion 118a of the distribution portion 118 was set to 30 mm. The difference h3 in height between the air supply port 142a of the air supply portion 142 and the lower end 119a of the connection pipe portion 119 was set to 120 mm.

Comparative Example 1

A header-equipped air diffusion device having the same configuration as that in Example 1 was produced except that the air feeding portion was configured to extend downward, similar to the air supply portion, to be inserted into the air storage portion and the difference h1 was set to 0 mm.

Comparative Example 2

A header-equipped air diffusion device having the same configuration as that in Example 1 was produced except that the air feeding portion was configured to extend downward to be inserted into the air storage portion, the air supply portion was configured to not be inserted into the air storage portion, and the difference h1 was set to 100 mm.

[Aeration Test]

A one-hour aeration operation under conditions where the header-equipped air diffusion device of each example was immersed in the sludge-containing treatment water (MLSS: 1.2 g/L) and the amount of air supply to the air storage portion of the header was set to 100 L/min, and a one-hour stop of the operation were repeated for two months. Thereafter, the degree of clogging of the air feeding portion in the header by dry sludge was visually confirmed and evaluated according to the following criteria.

(Evaluation Criteria)

○: Dry sludge is not seen in the air feeding portion.

Δ: Dry sludge adheres to an inner surface of the air feeding portion.

×: A dry sludge mass is seen in the air feeding portion.

Table 1 shows an evaluation result of each example.

TABLE 1

|  | Example 1 | Comparative Example 1 | Comparative Example 2 |
|---|---|---|---|
| Difference h1 [mm] | 100 | 0 | −100 |
| Difference h2 [mm] | 30 | 30 | 130 |
| Difference h3 [mm] | 120 | 120 | 20 |
| Evaluation of aeration test | ○ | Δ | × |

As shown in Table 1, in Example 1 where the air feeding port of the air feeding portion was positioned higher than the air supply port of the air supply portion in the air storage portion of the header, even after the operation and the stop were repeated, dry sludge was not seen in the air feeding portion and sludge was prevented from infiltrating into the air diffusion device from the header.

On the other hand, in Comparative Example 1 where the height of the air feeding port of the air feeding portion and the position of the air supply port of the air supply portion were the same, or in Comparative Example 2 where the air supply port of the air supply portion was positioned higher than the air feeding port of the air feeding portion, dry sludge was seen in the air feeding portion, and sludge was not sufficiently prevented from infiltrating into the air diffusion device from the header.

EXPLANATIONS OF LETTERS OR NUMERALS

100 MEMBRANE BIOREACTOR
110, 310 HEADER-EQUIPPED AIR DIFFUSION DEVICE
112 AIR DIFFUSION DEVICE
114, 314 HEADER
115 BLOWER
116 HORIZONTAL PIPE
118 DISTRIBUTION PORTION
118a OPENING PORTION
119 CONNECTION PIPE PORTION
120 SIPHON-TYPE AIR DIFFUSION PIPE
140, 340 AIR STORAGE PORTION
140a, 340a TARGET TREATMENT WATER-INLET PORT
142, 342 AIR SUPPLY PORTION
142a, 342a AIR SUPPLY PORT
144, 344 AIR FEEDING PORTION
144a, 344a AIR FEEDING PORT
146, 346 TRUNK PORTION
148, 148A UPPER PLATE PORTION
150 CONNECTION PIPE

The invention claimed is:

1. A header-equipped air diffusion device, comprising:
an air diffusion device and a header that are immersed in target treatment water, the header including (i) an air storage portion, configured to store air, (ii) an air supply pipe, configured to feed the air into the air storage portion, and (iii) an air feeding portion, through which the air in the air storage portion is fed out, the air supply pipe and the air feeding portion being provided in an upper portion of the air storage portion on an upper plate portion from which the air supply pipe and the air feeding portion extend orthogonally;
a target treatment water-inlet port formed in a lower portion of the air storage portion; and
an air feeding port of the air feeding portion which is open in the air storage portion,
wherein the air feeding portion and the air diffusion device are connected to each other, and air which is fed from the header is diffused by the air diffusion device,
wherein the air feeding port is positioned higher than an air supply port of the air supply pipe, the air supply port being open in the air storage portion,
wherein a partition portion is provided in the air storage portion on the upper plate portion, extending in an opposite orthogonal direction from the air supply pipe and the air feeding portion, so as to partition an upper portion in the air storage portion into an air supply pipe side and an air feeding portion side,
wherein a cylindrical portion formed by the partition portion and the upper plate portion and a part of a trunk portion of the air storage portion serves as a part of the air supply pipe, and an opening end on a lower end side of the partition portion serves as the air supply port,
wherein the air diffusion device includes a horizontal pipe that is connected to the air feeding portion and extends in a horizontal direction, and a plurality of distribution portions that are provided to extend downward with a gap therebetween in a longitudinal direction of the horizontal pipe and to distribute air from the horizontal pipe, an opening portion being formed an opposite sides of each of the distribution portions from the horizontal pipe, the horizontal pipe and the plurality of distribution portions being connected via a connection pipe portion, and a position of the air supply port of the air supply pipe in a height direction being the same as a position of the opening portion of at least one of the plurality of distribution portions or higher than the position of the opening portion,
wherein the air diffusion device further includes a plurality of siphon-type air diffusion pipes that are provided below the horizontal pipe, and air is supplied from the opening portion of each of the distribution portions to the siphon-type air diffusion pipe, and
wherein a height of the partition portion is 50 mm or greater,
wherein the air storage portion includes a trunk portion having a cylindrical shape and an upper plate portion provided to close an upper opening end of the trunk portion, and a target treatment water-inlet port is formed in a lower portion of the air storage portion by being a lower end side of the trunk portion in the air storage portion is open, and
wherein the flow passage cross-sectional area (Q) of the air feeding portion is smaller than the flow passage cross-sectional area (P) of a cylindrical portion positioned under the air feeding portion which is formed by the partition portion and part of the trunk portion.

2. The header-equipped air diffusion device according to claim 1, wherein the partition portion has a flat plate shape, and an angle of the partition portion with respect to a vertical direction is from 0° to 30°.

3. The header-equipped air diffusion device according to claim 1, wherein a difference in height between the air feeding port of the air feeding portion and the air supply port of the air supply portion is 50 mm or greater.

4. The header-equipped air diffusion device according to claim 1, wherein the air supply port of the air supply pipe is open on an opposite side from the air feeding portion.

5. The header-equipped air diffusion device according to claim 1, wherein a shield plate which shields scattering matter scattered in the air storage portion is provided on an air supply port side of the air feeding port in the air storage portion.

6. The header-equipped air diffusion device according to claim 1, wherein the air feeding portion and the horizontal pipe are connected to each other via a connection pipe having flexibility.

7. The header-equipped air diffusion device according to claim 1, wherein two or more siphon-type air diffusion pipes are disposed around each of the distribution portions, and air is supplied from the opening portion of the distribution portion to each of the two or more siphon-type air diffusion pipes around each of the distribution portions.

8. A membrane bioreactor, comprising:
the header-equipped air diffusion device according to claim 1;
a plurality of membrane modules that performs membrane separation of sludge-containing treatment water containing activated sludge;
a membrane separation tank,
a third flow passage which is connected to the plurality of membrane modules, and
a pump installed in the third flow passage, wherein the header-equipped air diffusion device is provided below the plurality of membrane modules, wherein the plurality of membrane modules includes a separation membrane, wherein the third flow passage is a flow passage through which the treatment water that has permeated through the separation membranes is discharged from the membrane separation tank to flow into the treatment water tank, wherein the pump discharges the treatment water which has permeated through the separation membranes of the plurality of membrane modules from the membrane separation tank, and wherein both of the air diffusion device and the header are provided in the membrane separation tank in a state immersed in the sludge-containing treatment water.

9. The header-equipped air diffusion device according to claim 1, wherein the partition portion is positioned at an angle with respect to a vertical direction in a range of from 0° to 30°.

10. The header-equipped air diffusion device according to claim 1, wherein the partition portion is positioned at an angle from 0° to 15° with respect to a vertical direction.

* * * * *